(12) United States Patent
Partovi et al.

(10) Patent No.: US 7,376,586 B1
(45) Date of Patent: May 20, 2008

(54) METHOD AND APPARATUS FOR ELECTRONIC COMMERCE USING A TELEPHONE INTERFACE

(75) Inventors: Hadi Partovi, San Francisco, CA (US); Roderick Steven Brathwaite, Livermore, CA (US); Angus Macdonald Davis, Sunnyvale, CA (US); Michael S. McCue, Los Gatos, CA (US); Brandon William Porter, Mountain View, CA (US); John Giannandrea, Palo Alto, CA (US); Eckart Walther, Redwood City, CA (US); Eugene Koh, Palo Alto, CA (US); Andy Scott, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/466,236

(22) Filed: Dec. 17, 1999

Related U.S. Application Data

(63) Continuation-in-part of application No. 09/426,102, filed on Oct. 22, 1999, now Pat. No. 6,807,574.

(51) Int. Cl.
*G06Q 30/00* (2006.01)
(52) U.S. Cl. .......................... 705/26; 705/27
(58) Field of Classification Search ............. 705/26–27
See application file for complete search history.

(56) References Cited

U.S. PATENT DOCUMENTS 5,208,745 A  5/1993  Quentin et al. ............. 364/188
5,283,888 A  2/1994  Dao et al. ................... 395/500
5,359,645 A  10/1994 Katz ............................ 379/93
5,463,696 A  10/1995 Beernink et al. ........... 382/186
5,465,378 A  11/1995 Duensing et al. ........... 395/800
5,493,606 A  2/1996  Osder et al. ................. 379/67
5,497,373 A  3/1996  Hulen et al. ................. 370/79

(Continued)

FOREIGN PATENT DOCUMENTS

EP          0 847 179 A2    6/1998

(Continued)

OTHER PUBLICATIONS

Industry Sector Analysis, "Canada: Speech Recognition Software Market," May 25, 1999, Dialog file #06037441.*

(Continued)

*Primary Examiner*—Robert M. Pond
(74) *Attorney, Agent, or Firm*—Perkins Coie LLP

(57) ABSTRACT

A voice portal supporting telephone to web server commerce is described. The voice portal allows users to access web servers using a hypertext transfer protocol (HTTP), optionally including the use of a secure sockets layer (SSL) protocol, to complete commercial transactions. Additionally, embodiments of the invention can employ a one word commerce model that abstracts the particular model used by various electronic commerce vendors' web sites. The one word commerce model permits a user to identify a product and signal her/his purchase intentions with a single word, phrase, or touch-tone command. The voice portal can then complete the transaction supplying the electronic commerce vendor necessary information about the purchaser, e.g., her/his address, telephone number, electronic mail address, credit card information, etc. As needed, the voice portal can prompt the purchaser for information.

41 Claims, 5 Drawing Sheets

U.S. PATENT DOCUMENTS

| | | | |
|---|---|---|---|
| 5,600,765 A | 2/1997 | Ando et al. | 395/133 |
| 5,632,002 A | 5/1997 | Hashimoto et al. | 395/2.4 |
| 5,710,887 A * | 1/1998 | Chelliah et al. | 705/26 |
| 5,745,882 A * | 4/1998 | Bixler et al. | 705/26 |
| 5,749,072 A | 5/1998 | Mazurkiewicz et al. | 704/275 |
| 5,758,322 A | 5/1998 | Rongley | 704/275 |
| 5,761,641 A | 6/1998 | Rozak et al. | 704/275 |
| 5,799,063 A | 8/1998 | Krane | 379/67 |
| 5,809,269 A | 9/1998 | Favot et al. | 395/376 |
| 5,819,220 A | 10/1998 | Sarukkai et al. | 704/243 |
| 5,872,779 A | 2/1999 | Vaudreuil | |
| 5,873,064 A | 2/1999 | De Armas et al. | 704/275 |
| 5,875,429 A | 2/1999 | Douglas | 704/275 |
| 5,884,262 A | 3/1999 | Wise et al. | 704/270 |
| 5,884,265 A | 3/1999 | Squitteri et al. | 704/275 |
| 5,884,266 A | 3/1999 | Dvorak | 704/275 |
| 5,893,063 A | 4/1999 | Loats et al. | 704/275 |
| 5,897,618 A | 4/1999 | Loats et al. | 704/275 |
| 5,915,001 A * | 6/1999 | Uppaluru | 379/88.22 |
| 5,918,213 A | 6/1999 | Bernard et al. | 705/26 |
| 5,920,841 A | 7/1999 | Schottmuller et al. | 704/275 |
| 5,926,789 A | 7/1999 | Barbara et al. | 704/275 |
| 5,937,037 A | 8/1999 | Kamel et al. | |
| 5,945,989 A | 8/1999 | Freishtat et al. | 345/329 |
| 5,953,392 A | 9/1999 | Rhie et al. | 379/88.13 |
| 5,978,450 A | 11/1999 | McAllister et al. | |
| 6,055,513 A * | 4/2000 | Katz et al. | 705/26 |
| 6,067,348 A | 5/2000 | Hibbeler | 379/88.16 |
| 6,070,142 A * | 5/2000 | McDonough et al. | 705/7 |
| 6,088,683 A * | 7/2000 | Jalili | 705/26 |
| 6,144,938 A | 11/2000 | Surace et al. | |
| 6,144,988 A | 11/2000 | Kappel | |
| 6,161,128 A | 12/2000 | Smyk | |
| 6,189,008 B1 | 2/2001 | Easty et al. | |
| 6,314,402 B1 * | 11/2001 | Monaco et al. | 704/275 |
| 6,334,103 B1 | 12/2001 | Surace et al. | |
| 6,341,264 B1 * | 1/2002 | Kuhn et al. | 704/255 |
| 6,483,523 B1 | 11/2002 | Feng | |
| 6,807,574 B1 | 10/2004 | Partovi et al. | |
| 6,842,767 B1 | 1/2005 | Partovi et al. | |
| 6,925,444 B1 * | 8/2005 | McCollom et al. | 705/14 |
| 6,941,273 B1 * | 9/2005 | Loghmani et al. | 705/26 |
| 6,996,609 B2 * | 2/2006 | Hickman et al. | 709/218 |
| 7,082,397 B2 * | 7/2006 | Cohen et al. | 704/270.1 |
| 2003/0147518 A1 | 8/2003 | Albal et al. | |

FOREIGN PATENT DOCUMENTS

| | | |
|---|---|---|
| EP | 0845894 A2 | 6/1998 |
| EP | 0859500 A2 * | 7/1998 |
| EP | 0 859 500 A2 | 8/1998 |
| EP | 0 889 627 A2 | 1/1999 |
| EP | 0889627 A2 * | 1/1999 |
| WO | WO 98/10361 | 3/1998 |
| WO | WO 98/56154 | 10/1998 |
| WO | WO 98/56154 | 12/1998 |
| WO | WO 99/00758 | 1/1999 |

OTHER PUBLICATIONS

Business Wire, "InTouch Systems Announces Inflection 3.0; Latest Release Of Voice Portal Software Offers Wireless And Internet Service Providers A Unique Approach To Attract And Retain Subscribers," Dec. 21, 1998, Dialog file 20 #03815355.*
WWW.Web.Archive.Org, "Nuance Communications Speech Web," 19991004/www.v-commerce.com/WebVoiceDialogs.gif.*
Hemphill and Thrift, "Surfing The Web By Voice." 1995, Multimedia '95, San Francisco, CA, USA.*
Voice Commerce: "Motorola, Visa, BroadVision and Other Team With Nuance To Introduce V-Commerce," PR Newswire, Oct. 6, 1998, Proquest #34848385.*
Voice Commerce: Quinton, Brian; "Reach Out And Touch The Web," Telephony, Oct. 19, 1998, v235n16pg43, Proquest #35273969.*
Voice Commerce: Dalton, Gregory; "Vendors Unite For Voice On The Web," Informationweek, Oct. 12, 1998, n704pg34, Proquest #87506874.*
Voice Commerce: "BroadVision Joins V-Commerce Alliance," PR Newswire, Oct. 6, 1998, Proquest #34848381.*
Item UU: "BroadVision, Inc. Receives Patent For BroadVision One-To-One Application System Technology," PR Newswire, Feb. 5, 1998, Proquest #25878398.*
Item VV: Voice Commerce: "Odeon Cinemas Film Line Goes Live With Nuance Natural Language Speech Recognition," PR Newswire, Oct. 20, 1998, Proquest #35237956.*
Item WW: "VeriFone Offers Merchants Cost-Effective Access To Highly Secure Online Payment Through ISPs; ISPs Gain Increased Revenue Opportunities With VeriFone Offerings," Business Wire, Sep. 28, 1998, Dialog file 810 #0913108.*
Voice Commerce: Hardy, Quentin; "Motorola Unviels New Technology For Internet Voice Commands," Asian Wall Street Journal, New York, N.Y., Oct. 1, 1998, p. 10, Proquest #34717710, 2pgs.*
Yasin, Rutrell; "An Embattled Encryption Standard Gets a Shot in the Arm," InternetWeek, Jul. 13, 1998, i723pg28, Proquest #31942425, 3pgs.*
Busch, M. et al., "Optimal Telephone Line Allocation of Voice ADS System", Proceedings of the 1993 Winter Simulation Conference, Dec. 12-15, 1993, pp. 1359-1360.
Hindus, D. et al., "Capturing, Structuring, and Representing Ubiquitous Audio", ACM Transactions on Information Systems, vol. 11, No. 4, Oct. 1993, pp. 376-400.
Hundus, D. et al., "Ubiquitous Audio: Capturing Spontaneous Collaboration", Proceedings of the Conference on Computer-Supported Cooperative Work, Nov. 1992, pp. 210-217.
Resnick, P., " HyperVoice—A Phone-Based CSCW Platform", Proceedings of the Conference on Computer-Supported Cooperative Work, Nov. 1992, pp. 218-225.
Resnick, P., "Phone-Based CSCW: Tools and Trials", ACM Transactions on Information Systems, vol. 11, No. 4, Oct. 1993, pp. 401-424.
Resnick, P. et al., "Skip and Scan: Cleaning Up Telephone Interfaces", CHI '92 Conference Proceedings—ACM Conference on Human Factors in Computing Systems, May 1992, pp. 419-426.
Schmandt, C., "Phoneshell: The Telephone as Computer Terminal", Proceedings ACM Multimedia 93, Aug. 1993, pp. 373-382.
Bolt, R., "Put-That-There": Voice and Gesture at the Graphics Interface, SIGGRAPH '80 Conference Proceedings, Quarterly Report of SIGGRAPH-ACM, Jul. 1980, pp. 262-270.
Hemphill, C. et al., "Surfing the Web by Voice", Proceedings of ACM Multimedia '95, Nov. 1995, pp. 215-222.
Rudnicky A. et al., "Spoken language recognition in an office management domain", ICASSP '91, International Conference on Acoustics, Speech, And Signal Processing, May 1991, pp. 829-832.
"Integrated Audio-Graphics User Interface", IBM Technical Disclosure Bulletin, Apr. 1991, pp. 368-371.
"Voice Augmented Menu Automated Telephone Response System", IBM Technical Disclosure Bulletin, Feb. 1995, pp. 57-62.
"Speech Recognition—Kurzweil Brings Voice Dictation to Windows", BYTE Magazine, Aug. 1994, p. 48.
Hemphill, Charles T., et al., "Surfing the Web by Voice", Proceedings—ACM Multimedia '95, San Francisco, CA, ACM 0-89791 (Nov. 1995), pp. 215-222.
Hemphill, Charles T., et al., "Speech-Aware Multimedia", IEEE Multimedia, IEEE (1996), pp. 74-78.
Lau, Raymond, et al., "WebGALAXY: beyond point and click—a conversational interface to a browser", Computer Networks and ISDN Systems, vol. 29 (1997), pp. 1385-1393.
Zue, Victor W., "Navigating the Information Superhighway Using Spoken Language Interfaces", IEEE Expert, IEEE, Oct. 1995, pp. 39-43.
Seneff, Stephanie, et al., "GALAXY-II: A Reference Architecture For Conversational System Development", technical paper, Massachusetts Institute of Technology (1998), 4 pages.

Meng, Helen, et al., "WHEELS: A Conversational System in the Automobile Classifieds Domain", *Proceedings—Fourth Intl. Conf. on Spoken Language Processing (ICSLP '96)*, Oct. 1996, pp. 542-545.

Goddeau, David, et al., "A Form-Based Dialogue Manager For Spoken Language Applications", *Proceedings—Fourth Intl. Conf. on Spoken Language Processing (ICSLP '96)*, Oct. 1996, pp. 701-704.

Lieberman, Henry, "Attaching Interface Agent Software to Applications", unpublished draft, Media Laboratory, Massachusetts Institute of Technology, circa 1993, 8 pages.

Schmandt, Chris, "Phoneshell: the telephone as computer terminal", as printed in *Proceedings of the conference on Multimedia '93*, pp. 373-382 (1993).

"VoxML 1.0 Language Reference", Revision 1.0a, Motorola, Inc., Oct. 1998, pp. 1-51.

"VoxML 1.0 Application Development Guide", Revision 1.0, Motorola, Inc., Sep. 1998, pp. 1-31.

Motorola VoxML Team, "VoxML SDK 1.0a Interim Release Notes", Motorola, Inc., Dec. 1998, 5 pages.

VoiceXML Forum, "Voice Extensible Markup Language—VoiceXML", Version 0.9, Aug. 1999, 63 pages.

James, Frankie, "AHA: audio HTML access", *Computer Networks and ISDN Systems*, vol. 29 (1997), pp. 1395-1404.

James, Frankie, "Lessons from Developing Audio HTML Interfaces", *Proceedings of The Third Intl. ACM Conf. on Assistive Technologies (ASSETS '98)*, ACM Press, Apr. 1998, pp. 27-34.

Raman, T.V., "Cascaded speech style sheets", *Computer Networks and ISDN Systems*, vol. 29 (1997), pp. 1377-1383.

Abrams, Marc, et al., "UIML: an appliance-independent XML user interface language", *Computer Networks*, vol. 31 (1999), pp. 1695-1708.

VoiceXML Forum, "Voice eXtensible Markup Language (VoiceXML)—Technical Background", copyright AT&T (1999), printed from website "www.vxmlforum.org/tech_bkgrnd.html" Aug. 17, 1999, 3 pages.

Cover, Robin, "The SGML/XML Web Page—Speech ML", Feb. 22, 1999, printed from website "www.oasis-open.org/cover/speechML.html" Aug. 17, 1999, 2 pages.

Cover, Robin, "The SGML/XML Web Page—VoxML Markup Language", Mar. 2, 1999, printed from website "www.oasis-open.org/cover/speechML.html" Aug. 17, 1999, 3 pages.

"Call Center Products", Edify Corp., copyright 1994-1999, printed from website "www.edify.com/templates/basic.asp?nodeid=665" Aug. 24, 1999, 1 page.

"Financial Services Products", Edify Corp., copyright 1994-1999, printed from website "www.edify.com/templates/basic.asp?nodeid=105" Aug. 24, 1999, 1 page.

"Technology Overview", Edify Corp., copyright 1994-1999, printed from website "www.edify.com/templates/basic.asp?nodeid=125" Aug. 24, 1999, 2 pages.

"Customer List", Edify Corp., copyright 1994-1999, printed from website "www.edify.com/templates/cust_list.asp?nodeid=145" Aug. 24, 1999, 2 pages.

"Customer Case Studies", Edify Corp., copyright 1994-1999, printed from website "www.edify.com/templates/cust_list.asp?nodeid=146" Aug. 24, 1999, 5 pages.

"Electronic Workforce Overview", Edify Corp., copyright 1994-1999, printed from website "www.edify.com/demos/elec_work_tour/*.html" Aug. 24, 1999, 13 pages.

"pwWebSpeak: General Information" and "pwWebSpeak Overview", The Productivity Works, copyright 1996-1999, last updated May 20, 1998, printed from website "www.prodworks.com/*.htm" Aug. 19, 1999, 5 pages.

Raman, T.V., "Emacspeak—Direct Speech Access", *Proceedings of The Second Annual ACM Conference on Assistive Technologies (ASSETS '96)*, ACM, Apr. 1996, pp. 32-36.

Krell, Mitchell, et al., "V-Lynx: Bringing the World Wide Web to Sight Impaired Users", *Proceedings of The Second Annual ACM Conference on Assistive Technologies (ASSETS '96)*, ACM, Apr. 1996, pp. 23-26.

"The AirFlash Search Engine", AirFlash, Inc., printed from website "www.airflash.com/afad_works_main.html" Aug. 17, 1999, 1 page.

Zajicek, Mary, et al., "A Web Navigation Tool for the Blind", *Proceedings of The Third Annual ACM Conference on Assistive Technologies (ASSETS '98)*, ACM, Apr. 1998, pp. 204-206.

Natural Language Speech Recognition systems from Nuance Communications, printed from website "www.nuance.com/*" Aug. 17, 1999, 9 pages.

"Nuance 6", product description, Nuance Communications, Menlo Park, CA, (1999), 2 pages.

"Nuance Developer's Toolkit", Nuance Communications, Menlo Park, CA, (1998), 2 pages.

V-Commerce™ product overview, introduction and demos, V-Commerce™, printed from website www.V-Commerce.com/*Aug. 17, 1999, 11 pages.

V-Commerce™ White Paper, Paper No.: WP006-0998, V-Commerce™, Menlo Park, CA, Oct. 6, 1998, 8 pgs.

"Nuance SpeechObjects and V-Commerce Applications", a Nuance white paper, Nuance Communications, Menlo Park, CA, (1999), 13 pages.

Asakawa, Chieko, et al., "User Interface of a Home Page Reader", *Proceedings of The Third Annual ACM Conference on Assistive Technologies (ASSETS '98)*, ACM, Apr. 1998, pp. 149-156.

Bayer, Samuel, "Embedding Speech in Web Interfaces", *Proceedings of The Fourth Annual Conference on Spoken Language Processing (ICSLP 96)*, Oct. 1996, pp. 1684-1687.

Kondo, Kazuhiro, et al., "Surfin' The World Wide Web With Japanese", *1997 IEEE International Conference on Acoustics, Speech, and Signal Processing*, vol. II of V, Apr. 1997, pp. 1151-1154.

Corrick, David, et al., "ELTON' Takes Orders for New Zealand Wines & Spirits", *Speech Technology*, Sep./Oct. 1988, pp. 87-89.

Mynatt, Elizabeth D., et al., "Mapping GUIs to Auditory Interfaces", *proceedings of the Fifth Annual Symposium on User Interface Software and Technology (UIST)*, ACM, Nov. 1992, pp. 61-70.

Gamm, Stephan, et al., "Findings with the Design of a Command-Based Speech Interface for a Voice Mail System", *Proceedings of the Third IEEE Workshop on Interactive Voice Technology for Telecommunications Applications (IVTTA-96)*, IEEE Communications Society, Sep. 1996, pp. 93-96.

Markowitz, Judith A., "Using Speech Recognition", Prentice Hall PTR, (1996), 293 pages.

Life, A., et al., "Data Collection for the MASK Kiosk: WOz vs Prototype System", *Proceedings of the Fourth International Conference on Spoken Language Processing (ICSLP 96)*, Oct. 1996, pp. 1672-1675.

Gauvain, J.L., et al., "Speech Recognition for an Information Kiosk", *Proceedings of the Fourth International Conference on Spoken Language Processing (ICSLP 96)*, Oct. 1996, pp. 849-852.

Mazor, Baruch, et al., "OASIS—A Speech Recognition System for Telephone Service Orders", *Proceedings of the 1994 International Conference on Spoken Language Processing (ICSLP 94)*, Sep. 1994, pp. 679-682.

Oerder, Martin, et al., "A Realtime Prototype of an Automatic Inquiry Systsm", *Proceedings of the 1994 International Conference on Spoken Language Processing (ICSLP 94)*, Sep. 1994, pp. 703-706.

Jurafsky, Daniel, et al., "The Berkeley Restaurant Project", *Proceedings of the 1994 International Conference on Spoken Language Processing (ICSLP 94)*, Sep. 1994, pp. 2139-2142.

Fugitt, Mitchell L., "A Voice Actuated Data Entry System for Analytical Data Collection", *Speech Technology* Oct./Nov. 1989, pp. 26-29.

Chien, Lee-Feng, et al., "Internet Chinese Information Retrieval Using Unconstrained Mandarin Speech Queries Based on A Client-Server Architecture and A PAT-tree-based Language Model", *1997 IEEE Intl. Conference on Acoustics, Speech, and Signal Processing*, Vol. II of V, Apr. 1997, pp. 1155-1158.

Walker, Marilyn A., et al., "What Can I Say?: Evaluating a Spoken Language Interface to Email", *Human Factors in Computing Systems (CHI-98), Conference Proceedings*, ACM Press, Apr. 1998, pp. 582-589.

Schmandt, Chris, et al., "Augmenting a Window System with Speech Input", *IEEE*, Aug. 1990, pp. 50-55.

Rudnicky, Alexander I., et al., "SpeechWear: A mobile speech system", *Proceedings of the Fourth International Conference on Spoken Language Processing (ICSLP 96)*, Oct. 1996, pp. 538-541.

Mellor, B.A., et al., "Evaluating Automatic Speech Recognition as a Component of a Multi-Input Device Human-Computer Interface", *Proceedings of the Fourth International Conference on Spoken Language Processing (ICSLP 96)*, Oct. 1996, pp. 1668-1671.

Katsuura, Makoto, et al., "The WWW Browser System with Spoken Keyword Recognition", *Transactions of Information Processing Society of Japan*, vol. 40, No. 2, Feb. 1999, pp. 443-452.

Asakawa, Chieko, et al., "User Interface of a Non-visual Web Access System", *Transactions of Information Processing Society of Japan*, vol. 40, No. 2, Feb. 1999, pp. 453-459.

Nakajima, Hideharu, et al., "Multimodal Interaction with WWW Browsers—An Interface Using Mouse Movement and Voiced Command", *Transactions of Information Processing Society of Japan*, vol. 39, No. 42, Apr. 1998, pp. 1127-1136.

Graziani, Paolo, et al., "Screen Reader for Windows Based on Speech Output", *Computers for Handicapped Persons, Proceedings of the 4th International Conference (ICCHP '94)*, Sep. 1994, pp. 96-100.

Boyd, F.W., Jr., "The Story of Tootie", *Proceedings—AVIOS '88, Voice I/O Systems Applications Conference*, Oct. 1988, 4 pages.

Brooks, Rodney, et al., "Voice Controlled Telephone Banking", *Proceedings—AVIOS '88, Voice I/O Systems Applications Conference*, Oct. 1988, 6 pages.

"American Express Credit Authorization Voice Response System", *Proceedings—AVIOS '87, Voice I/O Systems Applications Conference*, Oct. 1987, pp. 171-174.

Hein, J. Rand, "Customer Service Applications Using Voice Response And Agent Automation in a Banking Environment", *Proceedings—AVIOS '89, Voice I/O Systems Applications Conference*, Sep. 1989, pp. 9-14.

Olaszy, Gabor, et al., "IVR For Banking and Residential Telephone Subscribers Using Stored Messages Combined With a New Number-To-Speech Synthesis Method", *Human Factors and Voice Interactive Systems*, Kluwer Academic Publishers (1999), pp. 237-255.

Minker, Wolfgang, "Stochastic versus rule-based speech understanding for information retrieval", *Speech Communication*, vol. 25 (1998), pp. 223-247.

Mazor, B., et al., "The design of speech-interactive dialogs for transaction-automation systems", *Speech Communication*, vol. 17 (1995), pp. 313-320.

Morley, Sarah, et al., "Auditory Navigation in Hyperspace: Design and Evaluation of a Non-Visual Hypermedia System for Blind Users", *Proceedings of the Third Intl. ACM Conference on Assistive Technologies (ASSETS '98)*, ACM Press, Apr. 1998, pp. 100-107.

Quan, Margaret, "Application moves voice recognition out of expert realm", *Electronic Engineering Times*, Aug. 16, 1999, p. 60.

Johnson, R. Colin, "Neural speech system tackles e-commerce", *Electronic Eng. Times*, May 31, 1999, p. 44.

Poor, Alfred, "Talking to the Web, Part III", *PC Magazine*, Sep. 1, 1999, p. 80.

"CNN—No clicking, no buttons: com...ers 'speech sites'—Jul. 30, 1999", printed from website "www.cnn.com/TECH/ptech/9907/30/voicerec/" Aug. 25, 1999, 4 pages.

"Buyer's Guide 2000", Computer Telephony, Aug. 1999, advertisements for "envox", "VisualVoice 5.0" (Artisoft), "CallSuite Starter Bundle (Parity Software)", "PRONEXUS", "Infinity System (Amtelco)", "Lucent Speech Solutions (Lucent Technologies)", "SpeechWorks" and others, 10 pages.

Schmandt, Chris, "Phoneshell: the Telephone as Computer Terminal", ACM Multimedia 1993, pp. 373-382.

Lieberman, Henry, "Attaching Interface Agent Software to Applications", circa 1997, 8 pages.

B. Mazor et al., "The Design of Speech-Interactive Dialogs for Transaction-Automation Systems", Feb. 17, 1995, GTE Laboratories Inc., 40 Sylvan Rd., Waltham MA 02254, USA.

Gardner-Bonneau, "Human Factors and Voice Interactive Systems", 1999, Kluwer Academic Publishers, 101, Philip Dr., Norwell, MA 02061 USA.

Mazor et al., "Oasis—A Speech Recognition System for Telephone Service Orders", 1994, GTE Laboratories Inc., 40 Sylvan Rd., Waltham MA 02254, USA.

Hemphill et al., "Speech-Aware Multimedia", Spring 1996, IEEE Multimedia.

Lau et al., "Webgalaxy: Beyond Point and Click—A Conversational to a Browser", 1997, Computer Networks and ISDN Systems 29.

"VOXML 1.0 Application Development Guide", Sep. 1998, Motorola, Inc., Consumer Applications and Services Division, 55 Shurman Blvd., Ste. 600, Naperville, IL 60563 USA.

Corrick et al., "Elton Takes Orders for New Zealand Wines & Spirits", Sep./Oct. 1998, Speech Technology.

"American Express Credit Authorization Voice Response System", AVIOS '87 Voice I/O Systems Applications Conference, Radisson Mark Plaza Hotel, Alexandria, VA.

"Call Center Products", Edify Corporation, http://www.edify.com.

Meng et al., "Wheels: A Conversational System in the Automobile Classifieds Domain", Oct. 1996, ICSLP 96.

Brooks et al., "Voice Controlled Telephone Banking", Oct. 1988, AVIOS '88 Voice I/O Systems Applications Conference.

"V-Commerce—The V-Commerce Alliance!", http;//www.V-Commerce.com.

Hein, "Customer Service Applications Using Voice Response and Agent Automation in a Banking Environment", AVIOS '89 Voice I/O Systems Applications Conference.

"Human Factors and Voice Interactive Systems," Daryle Gardner-Bonneau, 1999 Kluwer Academic Publishers, Norwell, MA, USA, "IVR For Banking and Residential Telephone Subscribers Using Stored Messages Combined With a new Number-to-Speech Synthesis Method." pp. 237-255.

"Call Center Products," Edify Corp., copyright 1994-1999, printed from the website "www.edify.com".

Co-pending U.S. Appl. No. 09/513,237, filed Feb. 24, 2000; entitled "Method and Apparatus for Content Personalization Over a Telephone Interface" by Partovi et al.

Co-pending U.S. Appl. No. 11/009,789, filed Dec. 10, 2004; entitled "Method and Apparatus for Content Personalization Over a Telephone Interface" by Partovi et al.

\* cited by examiner

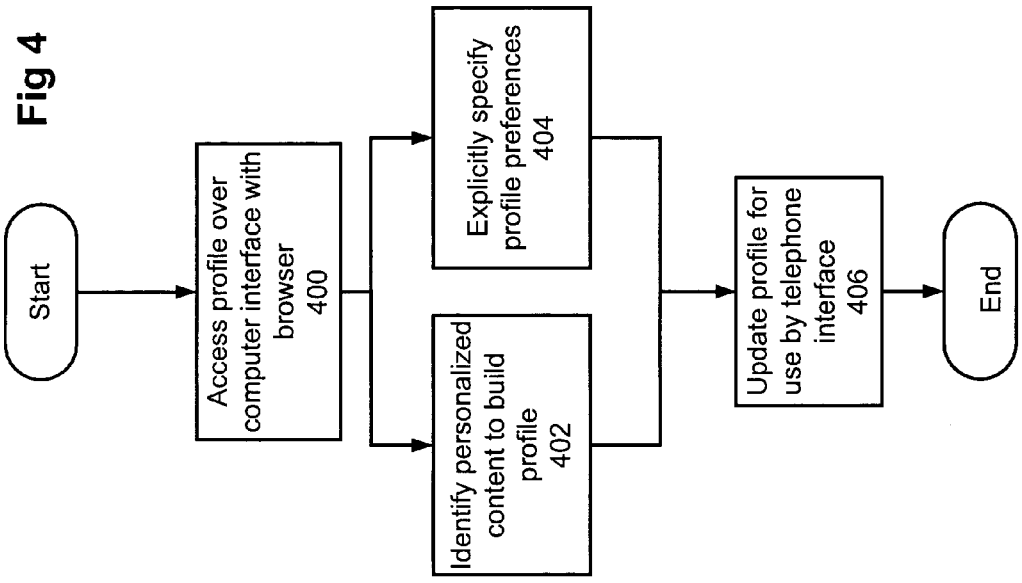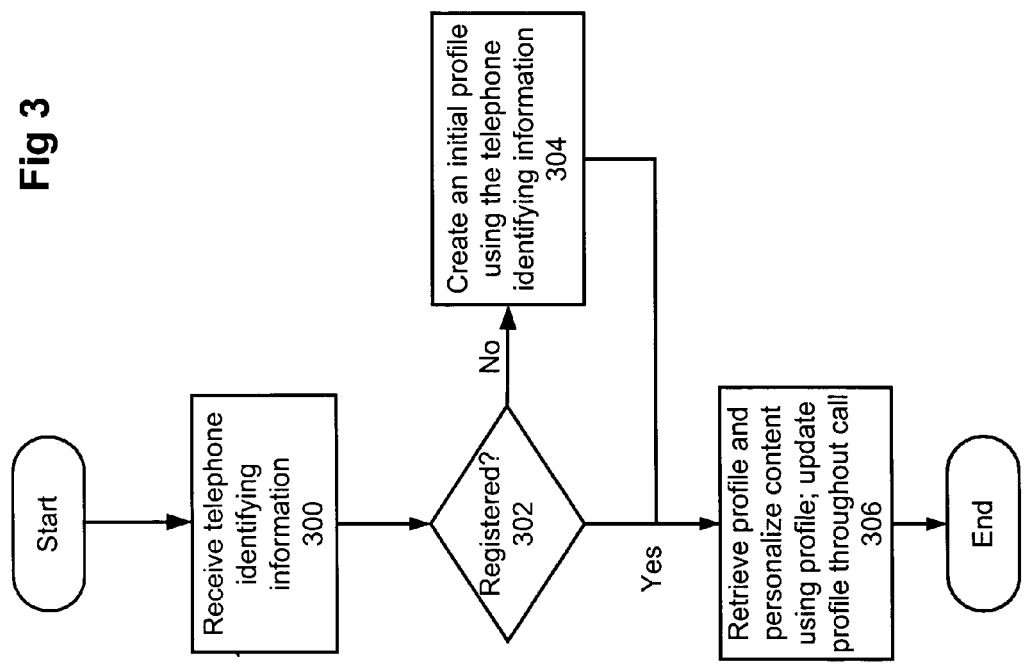

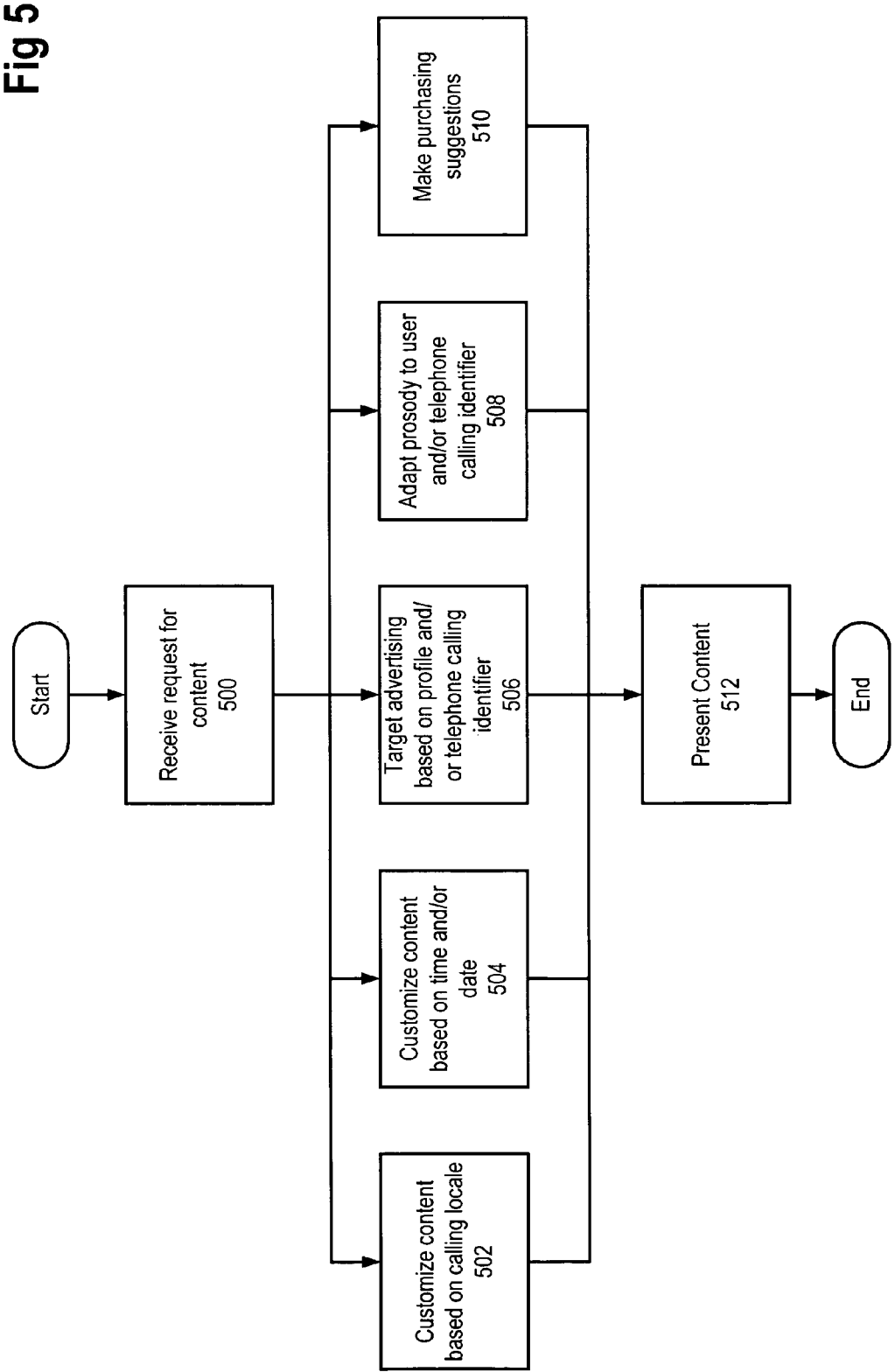

METHOD AND APPARATUS FOR ELECTRONIC COMMERCE USING A TELEPHONE INTERFACE

RELATED APPLICATIONS

This application is a continuation-in-part of, incorporates by reference, and claims priority from, U.S. patent application Ser. No. 09/426,102, entitled, "Method and Apparatus for Content Personalization Over a Telephone Interface," filed Oct. 22, 1999, now U.S. Pat. No. 6,807,574 having inventors Hadi Partovi, Roderick S. Brathwaite, Angus M. Davis, Michael S. McCue, Brandon W. Porter, John Giannandrea, Eckart Walther, Anthony Accardi, and Zhe Li.

BACKGROUND OF THE INVENTION

1. Field of the Invention

This invention relates to the field of electronic commerce. In particular, the invention relates to technologies for providing electronic commerce to users over a telephone interface. The invention also relates to identifying and registering users using telephone identifying information and personalizing the content, including the electronic commerce, presented to them using a profile selected using the telephone identifying information.

2. Description of the Related Art

The following describes various techniques used in telephone systems to provide enhanced user features. First, telephone identifying information will be discussed. Many telephone systems that support enhanced user features use telephone identifying information as a basic component. Then, a variety of example systems will be discussed that use telephone identifying information to provide enhanced user features will be discussed.

1. Telephone Identifying Information

The advent of automatic number identification (ANI) and calling number identification (CNID, CLID, or CID) within the North American Numbering Plan (NANP) has supported the creation of a number of services that use these pieces of telephone identifying information. Comparable systems may be used in other numbering plans and countries to support similar services.

For example, when consumers receive credit cards in the mail, they have to call from their home telephone numbers to activate the cards. This is a typical use of ANI. In this instance, the credit card company matches the ANI information provided when the consumer calls to a previously provided telephone number. If the ANI matches the credit card company's records, the credit card company activates the card.

2. Examples of Telephone System Personalization a. Personalization Generally

With the advent of widely available real-time delivery of telephone identifying information such as ANI, a number of systems have been developed to use that information. One of the most common uses of ANI is for credit card activation. However, previous systems have been single purpose and typically require reference to other information provided separately. For example, credit card activation lines require separately provided information, e.g. your home phone number from the application.

b. Building Personalized Content on the Web

Some systems allow a user to build personalized content over the web. One example is the my yahoo!™ service provided by Yahoo! of Santa Clara, Calif. at <http://my.yahoo.com/>. The personalized content pages developed on the web are delivered over the web to users accessing the pages with computers. These systems rely on a username and password type system to identify the user rather than telephone identifying information and the delivery mechanisms is different.

c. Interactive Personalization

Still other systems allow users to personalize the content without entering special editing modes. For example, Amazon.com, of Seattle, Wash., keeps track of your purchases and preferences using cookies stored on a customer's web browser.

Some telephone systems provide limited customization capabilities. For example, voice mail systems from Octel, a division of Lucent Technologies, allow a user to set preferences for prompt length, but those settings must be made explicitly by each user. Further, customization is limited to a few options like prompt length and outgoing message selection. The user can not redefine the way the voice mail system works for her/him beyond those narrow customization options. Further, these customizations do not affect the kinds of content and further the presentation is not selected based on telephone identifying information.

d. Locale Selection

Services such as Amtrak's 1-800-USA-RAIL reservation line use telephone identifying information to select an initial region. For example, if you call Amtrak's reservation number in the Northeastern United States, the system presents options relating to the Boston-Washington line. However, if you call from Calif., the system presents information about travel between San Francisco and Los Angeles.

This can be accomplished by using the calling party's area code and/or exchange included with the telephone identifying information to select a region. The area codes and/or exchanges can then be paired to different scripts or default selections. For example, the area codes for New York City, e.g. "212", could be mapped to the Northeast Corridor while San Francisco, "415", could be mapped to the San Francisco-Los Angeles line.

However this does not change the kind of content presented and it is not user-selected.

e. Time Appropriate Information Presentation

Several services provide information through the telephone. That information may be adapted based on the time of day or date.

Some systems provide the information irrespective of the telephone identifying information. One example is Moviefone™, 777-FILM in most locales. Moviefone™ uses the current time at the called number to present appropriate information. The called number can be obtained using the dialed number identification service (DNIS). Thus, if you call Moviefone™ in the San Francisco Bay Area at 10 o'clock in the morning, only movies starting after 10 o'clock in the morning in the San Francisco Bay Area will be presented to you. However, if you call the Philadelphia Moviefone™, +1 (215) 222-FILM, from California, you will hear the Philadelphia movie times in Eastern Time. Thus, at 10 o'clock in the morning Pacific Time, a call to the Philadelphia Moviefone™ will produce information for Philadelphia show times after one o'clock in the afternoon Eastern Time at Philadelphia area theatres.

f. Targeted Advertising

Some free long distance services provide customized advertising to support their services. One example is FreeWay™ offered by Broadpoint, of Landover, Md., <http://www.broadpoint.com/>. These services require an explicit user registration process, typically using a computer to access a web site, to provide the service with a profile. Once the profile is provided, the advertising is targeted to the particular person's explicitly provided demographic information. In some instances, the advertising may be targeted both based on the caller's demographics and their location. Thus, callers from the San Francisco Bay Area with a particular explicit demographic profile may be presented one ad, while callers from outside the San Francisco Bay Area may be presented with another ad. Another, similar, service is offered on by phone by UAccess, Inc., <http://www.uaccess.com/>, by calling +1 (800) UACCESS, and provides consumers targeted advertising based on profile information they enter.

g. Voice Character

Most telephone systems have a small number of voice actors. Continuing with the example of Moviefone™, one actor performs all of the menus and prompts. Other systems may use different voice actors for different subsystems.

These actors are typically selected on a system wide basis and as such, different voices, talents, speeds, characteristics, dialects, and other prosody aspects of the presentation are not user selectable.

h. Purchase Recommendations

Voice systems such as GALAXY from the Massachusetts Institute of Technology (MIT), Cambridge, Mass., have been adapted to provide information about purchasing decisions for used cars. For example, GALAXY has been used to allow for interactive browsing of automobile classified ads. These voice systems are problem domain specific. Further, the systems are designed to locate vehicles matching a particular set of criterion, rather than making actual recommendations.

Other systems are web based. For example, Amazon.com will make book suggestions for users connected to the web via a computer. However, those suggestions are limited to a particular site, e.g. Amazon.com.

i. Voice Login

Most telephone systems require a user to explicitly identify herself/himself by using a combination of a login identifier, e.g. credit card number, account number, etc., and a personal identification number (PIN). Some systems abbreviate this process by allowing a user calling from a particular phone to shortcut this process slightly. For example, callers using a phone number associated with a particular credit card might only be asked to enter the last four digits of their credit card number together with their billing zip code instead of all sixteen digits of the card number. Other products such as Nuance Verifier™ from Nuance Communications, Menlo Park, Calif., support voice login capabilities, e.g. you just speak instead of entering a password.

i. Initial Profile Generation from Database Lookups

Most systems that provide information over the telephone require users to explicitly answer one or more questions in one form or another, e.g. over the phone, the web, and/or in written form. These questions form a demographic and/or psychographic profile for the user. All of these systems require the user to explicitly provide her/his profile information.

3. Telephone Commerce Systems

Prior techniques for telephone commerce have required users to explicitly identify themselves and provide credit card, or other billing information, for each transaction. For example, Moviefone™ allows consumers to purchase tickets for movies via a telephone interface. To purchase the tickets, the user must explicitly key her/his credit card information into the Moviefone™ system. For verification purposes, Moviefone™ requires the presence of the credit card when the tickets are picked up at the theatre.

Other automated systems operate similarly. Some systems record a user speaking her/his address either on tape, or in a computer memory, to allow for entry of the user's address information. These systems require offline processing by humans to key the voice entered data for order completion. Examples of these types of systems may include telephone operator base commerce, e.g. mail-order catalogs, and telephone based stock trading.

SUMMARY OF THE INVENTION

A voice portal supporting telephone to web server commerce is described. The voice portal allows users to access web servers using a hypertext transfer protocol (HTTP), optionally including the use of a secure sockets layer (SSL) protocol, to complete commercial transactions. This allows the voice portal to complete transactions at non-voice enabled electronic commerce sites through a data connectivity engine supporting access to standard electronic commerce web sites.

Some embodiments of the invention employ a one word commerce model. This model abstracts the particular commerce model used by electronic commerce vendors, e.g. web site A uses a shopping cart model, web site B uses a one-click buy model, web site C uses a third purchase model. The one word commerce model permits a purchaser to identify a product and then signal her/his purchase intentions with a single word, phrase, or touch-tone command. Thus, the particular vendor's commerce—and fulfillment—model is irrelevant.

The voice portal can then complete the transaction by supplying the electronic commerce vendor all necessary information about the purchaser to complete the transaction. For example, the voice portal can provide the purchaser's address, telephone number, electronic mail address, credit card information, etc.

As needed, the voice portal can prompt the purchaser for information. For example, the first time a purchaser uses the voice portal, her/his shipping address may not be known to the voice portal. The voice portal can maintain a record of this information apart from a particular vendor. Thus, information need not be repeatedly collected and can be automatically re-used for future purchases at different vendors.

Further, embodiments of the invention can provide a record of commerce transactions in the form of voice receipts. The voice receipts can include a vendor specific tracking and status information. For example, the voice receipt may include tracking information such as the shipping status from the web site of an electronic commerce vendor as well as details of the purchase. Similarly, the voice receipt for a stock trade request could include the time of execution, the execution price, and/or other merchant specific information. The voice receipts can be reviewed over the telephone interface and/or from a web site coupled to the voice portal.

Selective password protection of the commerce features are afforded by some embodiments of the invention to reduce the likelihood of unauthorized transactions. For example, some embodiments require the user to provide a password, or other identification number, to the voice portal for the first commerce transaction of each telephone session.

Additionally, embodiments of the invention may employ a range of personalization techniques to assist purchasers in selecting items as well as in the presentation of suggested items. For example, the voice portal may supply customized commerce suggestions based on the time of day, the time of the year, special events in the user's locale, etc.

BRIEF DESCRIPTION OF THE FIGURES

FIG. 3 is a process flow diagram supporting personalization and registration of and for users accessing a voice portal over a telephone interface.

FIG. 4 is a process flow diagram for personalizing a voice portal over a web based interface.

FIG. 5 is a process flow diagram for providing personalized content according to some embodiments of the invention.

DETAILED DESCRIPTION

A. Introduction

Figure 1:
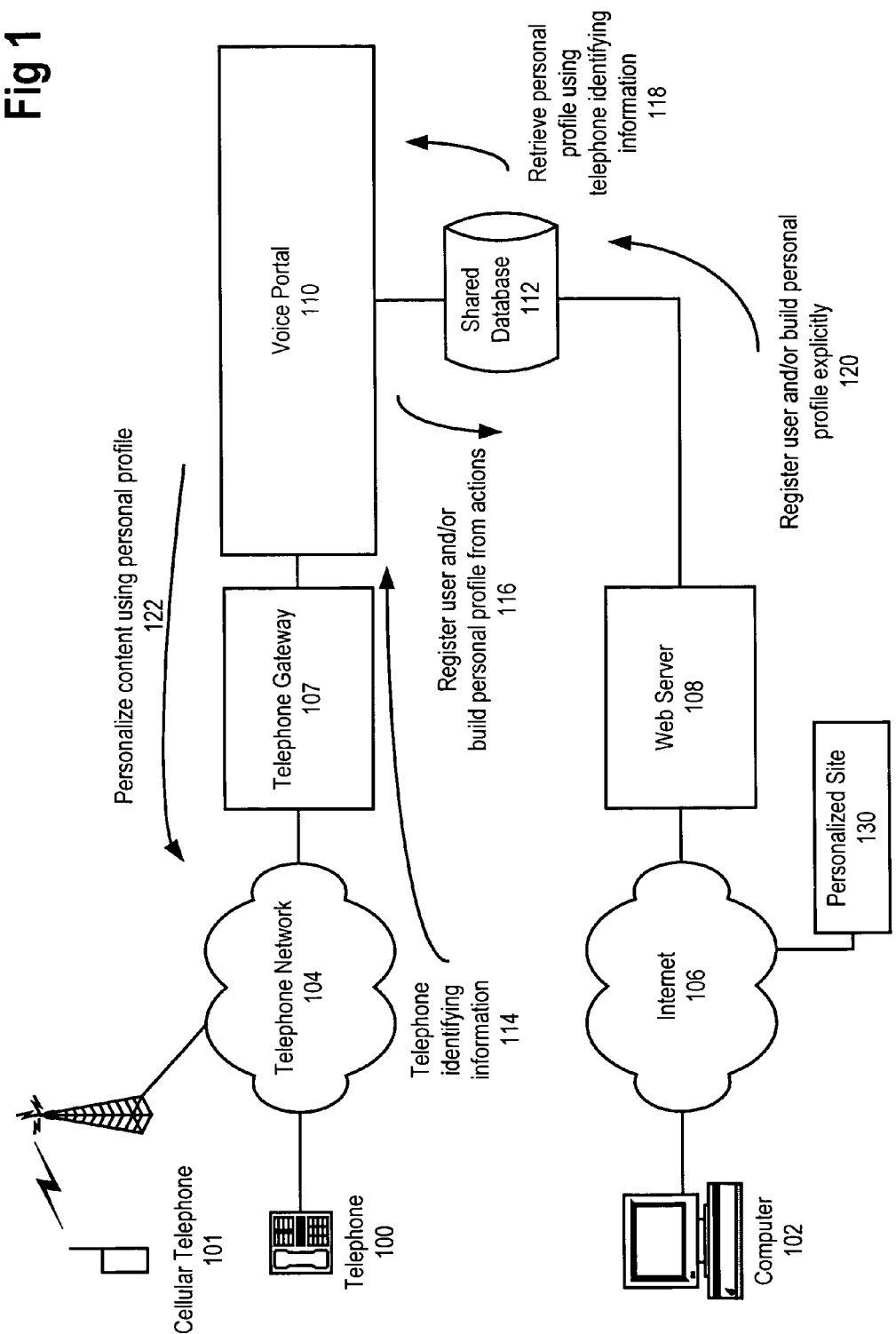
FIG. 1 illustrates a system including embodiments of the invention used to provide personalized content to users of telephones according to telephone identifying information.

A voice, portal supporting electronic commerce over a telephone interface is described. The voice portal allows users of telephones, including cellular telephones, to access a voice portal by dialing a phone number to purchase goods and services. The information provided over the voice portal may come from the World Wide Web (WWW), databases, third parties, and/or other sources.

The term voice portal refers to the capability of various embodiments of the invention to provide commerce capabilities over a telephone interface to a caller. The voice portal can receive dual-tone multi-frequency (DTMF or touch-tone) commands as well as spoken commands to further control the content presented and direct commerce transactions as well as the manner of presentation. The term audio request, or input, is used to refer to either a voice or touch-tone input, or a combination of the two types of input.

Embodiments of the invention use telephone identifying information to personalize caller interactions with the voice portal. This allows the system to present highly customized information to each caller based on a personal profile the system associates with the telephone identifying information.

The invention will be described in greater detail as follows. First, a number of definitions useful to understanding the invention are presented. Then, the hardware and software architecture is presented in the System Overview. Then, a series of sections describe the various personalization features provided by different embodiments of the invention. Then, a section describes the electronic commerce capabilities of the system.

B. Definitions

1. Telephone Identifying Information

For the purposes of this application, the term telephone identifying information will be used to refer to ANI information, CID information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. cellular, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information as shown and described more fully in connection with FIG. 6. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Qualified

The term qualified as it is used in this application refers to whether or not a particular user being presented an advertisement, or other material, meets the demographic and/or psychographic profile requirements for that advertisement, or content. For example, a San Francisco-based bookstore might request that all listeners to its advertisement be located in a particular part of the San Francisco Bay Area. Thus, a user of the system would be qualified if she lived in the designated part of the San Francisco Bay Area.

Different embodiments of the invention may qualify users of the system according to different requirements. For example, in some instances advertising, or content, is qualified solely based on telephone identifying information. In other embodiments the telephone identifying information is used in conjunction with other information such as an associated user profile, a reverse telephone number lookup for locale demographics, and/or other information.

5. Locale

As used in this application, the term locale refers to any geographic area. The geographic area may be a neighborhood, a city, a county, a metropolitan region, a state, a country, a continent, a group of countries, and/or some other collection of one or more geographic areas, e.g. all United State major metropolitan areas.

For this reason, a single user of the system may be considered to be in several locales. For example, a caller from Palo Alto, Calif., might be in the Palo Alto locale, a Silicon Valley locale, a San Francisco Bay Area locale, a Northern California locale, a California state locale, and a United States locale.

Thus, the telephone identifying information for a single telephone number can be mapped to a number of system-defined locales.

6. Voice Character

The term voice character as it is used in this application refers to all aspects of speech pronunciation including dialect, speed, volume, gender of speaker, pitch, language, voice talent used, actor, characteristics of speech, and/or other prosody values. Users can adjust the voice character of the system by changing their voice character settings.

For example, an elderly user could select voice character settings that provide louder volume and slower speech. Similarly, a caller from the South could adjust the voice character settings to support a Southern dialect.

7. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

C. System Overview

First, the hardware and software architecture of a system including an embodiment of the invention will be described with reference to FIGS. 1-2. FIG. 1 illustrates a system including embodiments of the invention used to provide personalized content to users of telephones according to telephone identifying information. The system of FIG. 1 can be used to allow users of standard telephones and cellular telephones to access a voice portal with personalized content from their telephones.

The following lists the elements of FIG. 1 and describes their interconnections. FIG. 1 includes a telephone 100, a cellular telephone 101, a computer 102, a telephone network 104, an Internet 106, a telephone gateway 107, a web server 108, a voice portal 110, a shared database 112 and a personalized site 130. The cellular telephone 101 and the telephone 100 are coupled in communication with the telephone network 104. The telephone network 104 is coupled in communication with the telephone gateway 107. The telephone gateway 107 is coupled in communication with the voice portal 110. The computer 102 is coupled in communication with the Internet 106. The Internet 106 is coupled in communication with the web server 108. The voice portal 110 and the web server 108 are coupled in communication with the shared database 112. The personalized site 130 is coupled in communication with the Internet 106.

The following describes each of the elements of FIG. 1 in greater detail. The use of each of the elements will be described further in conjunction with the sections describing the personalization features.

The telephone 100 and the cellular telephone 101 are two different telephone interfaces to the voice portal 110. The telephone 100 and the cellular telephone 101 may be any sort of telephone and/or cellular telephone. For example the telephone 100 or the cellular telephone 101 may be a land line phone, a PBX telephone, a satellite phone, a wireless telephone, and/or any other type of communication device capable of providing voice communication and/or touch-tone signals over the telephone network 104. However, any audio signal carrying interface could be used.

The telephone network 104 may be the public switched telephone network (PSTN) and/or some other type of telephone network. For example, some embodiments of the invention may allow users with a voice over Internet Protocol (IP) phone to access the voice portal 110. The telephone network 104 is coupled to the telephone gateway 107 that allows the voice communications and/or touch-tone signals from the telephone network 104 to reach the voice portal 110 in usable form. Similarly, the telephone gateway 107 allows audio signals generated by the voice portal 110 to be sent over the telephone network 104 to respective telephones, e.g. the telephone 100. The telephone network 104 generally represents an audio signal carrying network.

The computer 102 is a computer such as a personal computer, a thin client computer, a server computer, a handheld computer, a set top box computer, and/or some other type of visual web browsing device. The computer 102 is coupled in communication with the Internet 106, e.g. by a dial-up connection, a digital subscriber loop (DSL), a cable modem, and/or some other type of connection. This allows the computer 102 to communicate with the web server 108. The computer 102 typically provides a visual interface to the WWW and the web server 108 using web browsing software such as Internet Explorer™ from Microsoft Corporation, Redmond, Wash.

Both the web server 108 and the voice portal 110 are capable of communicating with the shared database 112 to register users, build personal profiles implicitly and/or explicitly as will be described more fully below. The database 112 stores profiles for each user based on an association between one or more pieces of telephone identifying information and a particular user. Thus, the database may have a profile for a user Sarah Smith that is keyed to her home telephone number, e.g. 650-493-####. Additionally, Sarah could associate other numbers, e.g. work, cellular, etc., with her profile either implicitly, e.g. by repeatedly calling the voice portal 110 from those numbers, or explicitly, e.g. by adding those numbers to the system directly.

In some embodiments, an existing profile for a web-based portal is adapted for use by the voice portal 110 by associating one or more telephone numbers with the existing profile as stored in the shared database 112. In these embodiments, the existing profile may be further modified for use with the voice portal 110 to allow for different preferences between the web and the voice interfaces.

The call flow arrows 114-122 shown on FIG. 1 will be described in greater detail below.

Figure 2:
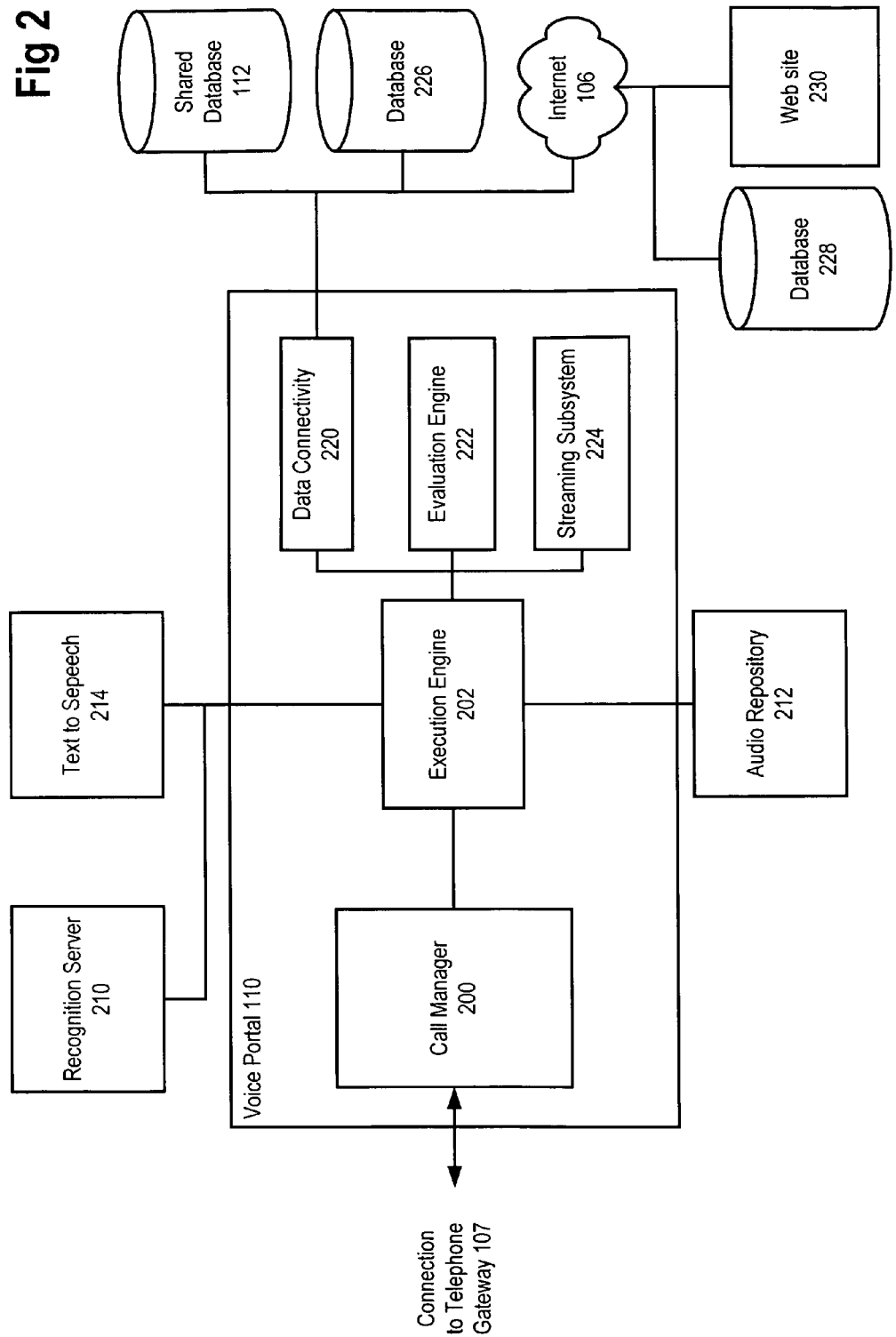
FIG. 2 illustrates the components of a voice portal supporting personalized content.

FIG. 2 illustrates the components of a voice portal supporting personalized content. This could be used to support the voice portal 110 and provide personal content as described above.

The following lists the elements of FIG. 2 and describes their interconnections. The voice portal 110 is coupled in communication with the telephone gateway 107. The voice portal 110 includes a call manager 200, an execution engine 202, a data connectivity engine 220, an evaluation engine 222 and a streaming engine 224. Additionally FIG. 2 includes elements that may be included in the voice portal 110, or which may be separate from, but coupled to, the voice portal 110. Thus FIG. 2 also includes a recognition server 210, a text to speech server 214, an audio repository 212, the shared database 112, a database 226, the Internet 106, a database 228 and a web site 230. The call manager 200 within the voice portal 110 is coupled to the execution engine 202. The execution engine 202 is coupled to the recognition server 210, the text to speech server 214, the audio repository 212, data connectivity engine 220, the evaluation engine 222 and the streaming engine 224. The data connectivity engine 220 is coupled in communication with the shared database 112, the database 226 and the Internet 106. The Internet 106 is coupled in communication with database 228 and the web site 230.

The following describes each of the elements of FIG. 2 in greater detail. The use of each of the elements will be described further in conjunction with the sections describing the personalization features.

Typically, the voice portal 110 is implemented using one or more computers. The computers may be server computers such as UNIX workstations, personal computers and/or some other type of computers. Each of the components of the voice portal 110 may be implemented on a single computer, multiple computers and/or in a distributed fashion. Thus, each of the components of the voice portal 110 is a functional unit that may be divided over multiple computers and/or multiple processors. The voice portal 110 represents an example of a telephone interface subsystem. Different components may be included in a telephone interface subsystem. For example, a telephone interface subsystem may include one or more of the following components: the call manager 200, the execution engine, the data connectivity 220, the evaluation engine 222, the streaming subsystem 224, the audio repository 212, the text to speech 214 and/or the recognition engine 210.

The call manager 200 is responsible for scheduling call and process flow among the various components of the voice portal 110. The call manager 200 sequences access to the execution engine 202. Similarly, the execution engine 202 handles access to the recognition server 210, the text to speech server 214, the audio repository 212, the data connectivity engine 220, the evaluation engine 222 and the streaming engine 224.

The recognition server 210 supports voice, or speech, recognition. The recognition server 210 may use Nuance 6™ recognition software from Nuance Communications, Menlo Park, Calif., and/or some other speech recognition product. The execution engine 202 provides necessary grammars to the recognition server 210 to assist in the recognition process. The results from the recognition server 210 can then be used by the execution engine 202 to further direct the call session. Additionally, the recognition server 110 may support voice login using products such as Nuance Verifier™ and/or other voice login and verification products.

The text to speech server 214 supports the conversion of text to synthesized speech for transmission over the telephone gateway 107. For example, the execution engine 202 could request that the phrase, "The temperature in Palo Alto, Calif., is currently 58 degrees and rising" be spoken to a caller. That phrase would be translated to speech by the text to speech server 214 for playback over the telephone network on the telephone (e.g. the telephone 100). Additionally the text to speech server 214 may respond using a selected dialect and/or other voice character settings appropriate for the caller.

The audio repository 212 may include recorded sounds and/or voices. In some embodiments the audio repository 212 is coupled to one of the databases (e.g. the database 226, the database 228 and/or the shared database 112) for storage of audio files. Typically, the audio repository server 212 responds to requests from the execution engine 202 to play a specific sound or recording.

For example, the audio repository 212 may contain a standard voice greeting for callers to the voice portal 110, in which case the execution engine 202 could request playback of that particular sound file. The selected sound file would then be delivered by the audio repository 212 through the call manager 200 and across the telephone gateway 107 to the caller on the telephone, e.g. the telephone 100. Additionally, the telephone gateway 107 may include digital signal processors (DSPs) that support the generation of sounds and/or audio mixing.

The execution engine 202 supports the execution of multiple threads with each thread operating one or more applications for a particular call to the voice portal 110. Thus, for example, if the user has called in to the voice portal 110, a thread may be started to provide her/him a voice interface to the system and for accessing other options.

In some embodiments of the invention an extensible markup language (XML)-style language is used to program applications. Each application is then written in the XML-style language and executed in a thread on the execution engine 202. In some embodiments, an XML-style language such as VoiceXML from the VoiceXML Forum, <http://www.voicexml.org/>, is extended for use by the execution engine 202 in the voice portal 110.

Additionally, the execution engine 202 may access the data connectivity engine 220 for access to databases and web sites (e.g. the shared database 112, the web site 230), the evaluation engine 222 for computing tasks and the streaming engine 224 for presentation of streaming media and audio. The streaming engine 224 may allow users of the voice portal 110 to access streaming audio content, or the audio portion of streaming video content, over the telephone interface. For example, a streaming media broadcast from ZDNet™ could be accessed by the streaming engine 224 for playback through the voice portal.

The data connectivity engine 220 supports access to a variety of databases including databases accessed across the Internet 106, e.g. the database 228, and also access to web sites over the Internet such as the web site 230. In some embodiments the data connectivity engine can access standard query language (SQL) databases, open database connectivity databases (ODBC), and/or other types of databases. The shared database 112 is represented separately from the other databases in FIG. 2; however, the shared database 112 may in fact be part of one of the other databases, e.g. the database 226. Thus, the shared database 112 is distinguished from other databases accessed by the voice portal 110 in that it contains user profile information.

Having described the hardware and software architecture supporting various embodiments of the invention, the various personalization features provided by different embodiments of the invention will now be described.

D. Telephone Driven Profile Building

Turning to FIG. 3, the process of creating a profile using a telephone interface will be described. This process will be described with reference to the call flow arrows shown on FIG. 1 as well.

The voice portal 110 is able to flexibly handle multiple callers from a single telephone, e.g. Tom and Dick are roommates and both call from 650-493-####. Similarly, the voice portal 110 is able to handle a single caller that uses multiple telephones, e.g. Tom has a cell phone 650-245-####, his home phone 650-493-####, and a work phone 408-301-####. The manner in which the voice portal 110 can handle some of the above situations will be discussed throughout. In the example used while describing FIG. 3, the process will be described using a caller Jane Smith as an exemplary caller who has never registered with the voice portal 110 from any telephone and an exemplary caller John Doe who has previously called the voice portal 110 from his telephone 100.

First, at step 300, telephone identifying information is received. This is shown in FIG. 1 by call flow arrow 114 representing the transfer of telephone identifying information through the telephone gateway 107 to the voice portal 110. This step occurs after a user has placed a call to the voice portal 110 with a telephone, e.g. the telephone 100.

Next, at step 302, a determination is made as to whether the telephone identifying information corresponds to a known profile, e.g. is the user registered? Some examples may be illustrative. If Jane Smith uses the cellular telephone 101 to call the voice portal 110 for the first time, her telephone identifying information will not be associated with any existing unique profile in the shared database 112. Therefore, at step 302, the determination would be made that she is not registered and the process would continue at step 304. In contrast, John Doe has previously called the voice portal from the telephone 100 and so his telephone identifying information will be associated with a profile in the shared database 112 and the process would continue at step 306.

If, the telephone identifying information is not associated with an existing profile in the shared database 112, a new profile is created at step 304. The new profile may be initialized using a variety of information derived from the telephone identifying information and/or predetermined values for the voice portal 110. Thus, for example, when Jane Smith calls for the first time from the cellular telephone 101, an initial profile can be created using the calling number, e.g. 650-493-####, included in the telephone identifying information to select initial profile settings. The call flow arrow 116 shows this process on FIG. 1. The use of the telephone identifying information to create an initial profile is discussed below in the section "Automatic Profile Initialization".

In some embodiments, the profile is not initialized using the telephone identifying information. In other embodiments, the user may be explicitly queried by the voice portal 110 to create one or more components of the initial profile, e.g. "Please speak your first name", to allow for more personalized prompting by the voice portal 110. Once a profile is created, the process continues at step 306.

At step 306, the profile is retrieved from the shared database 112 as shown by the call flow arrow 118. The profile can be updated throughout the call based on the user's behavior and actions—implicit preferences—as well as explicit requests from the user to customize the voice portal 110. Once a profile is selected at step 306, the personalized content can be presented to the user as shown by the call flow arrow 122 in FIG. 1.

For example, John Doe, who is calling from the telephone 100, already has a profile in the shared database 112. That profile may indicate that John prefers a southern dialect and likes to hear a quick stock market report immediately on call in. Thus, for John, his telephone identifying information serves to log him directly into the system and trigger the personalized behavior unique to him: a quick stock market report in a southern dialect. In contrast, a different caller, Sarah Brown, from a different telephone will be provided different personalized content based on that telephone identifying information.

The voice portal may support multiple callers from a single telephone. For example, Sarah Brown and John Doe may both use the telephone 100 to call the voice portal 110. In the case where two or more profiles are identified with the same telephone identifying information, the voice portal may prompt for a password or other unique identifier, either as voice or touch-tone, to select among the profiles.

However, as a general matter, the voice portal is configured to minimize the need for a caller to provide a password. Thus, during a single call session, the caller is typically only asked to provide her/his password a single time. However, some embodiments of the invention may require that a password always be used to complete commercial transactions and/or after the passage of a predetermined period, e.g. ten minutes since last password prompt. In some embodiments, the user may adjust her/his profile to allow login without a password for playback features.

Also, a single profile can be associated with multiple calling numbers. For example, the user Jane Doe could specify that both the telephone 100 and the cellular telephone 101 should be associated with her profile. Similarly, if Jane calls from a new telephone, e.g. pay phone, she can provide her existing telephone number and her password to access her profile. In some embodiments, whenever the user calls from a new telephone number, she/he is prompted as to whether to remember the number for future use. In some embodiments, additional telephone identifying information, e.g. this is a pay phone, is used so that the caller is not prompted to associated telephone numbers that are likely to be single time uses with her/his profile. Similarly, voice verification may be used to recognize a caller's voice instead of, or in addition to, using a password or other identification number.

Typical events that would require a password, or that the user be authenticated previously with a password, might include adding and removing items from the user profile through explicit commands as well as requests for specific personal information, e.g. that user's stock portfolio, bank account balances, etc.

It is not necessary for callers to the voice portal 110 to explicitly specify their preferences using this embodiment of the invention. The callers' behaviors and actions are used by the voice portal 110 to adopt implicit preferences, sometimes after receiving confirmation. For example, behaviors and actions reflecting repeated access to a content in a particular topic, or a particular topic, may cause the voice portal 110 to automatically include the repeatedly requested content in the default message.

For example, if a caller from New York City repeatedly asks for the weather in San Francisco, the system can add the San Francisco weather to the standard weather report. Alternatively, the system may request confirmation before adding the weather report, e.g. "Would you like me to include San Francisco in the standard weather report?" Similarly, at the level of topics, users who repeatedly ask for information about business related issues may find that the system will adjust the main menu to include business. Similarly, if that same user never asks for sports scores, that option may drop off the main menu. In some embodiments, the system may ask for confirmation before modifying the menu choices, or the system may notify the user of a modification and/or allow a user to review/change past modifications. As a result, the structure and content of the call may change, e.g. San Francisco weather will be announced at the beginning of future calls and sports information may be omitted.

Through the use of this process, the need for a specialized editing mode of the type seen on customizable web portals is reduced. The user's actions and behaviors shape the options presented to her/him. Thus, reducing the need to explicitly pick topics and/or content in an editing mode. However, some embodiments of the invention may allow for explicit profile creation in an editing mode over the web, see below, and/or over the telephone. Also, users are typically permitted to add and remove topics and/or items at will with explicit commands, e.g. "Remember this", "Remove", "Add to my stock list", etc.

E. Web Driven Profile Building

Turning to FIG. 4, the process of modifying a profile for use over a telephone interface over the web will be described. This process will be described with reference to the call flow arrows shown on FIG. 1 as well.

The process shown in FIG. 4 assumes that a profile has already been created, e.g. by calling for the first time as described above. However, in some embodiments of the invention, users may create profiles using the web interface by providing the telephone identifying information for their primary calling phone number and a password. As is the case with the telephone registration process described in step 304, the telephone identifying information provided, here the primary calling phone number, can be used to create the initial profile.

Starting at step 400, the profile is accessed using a computer (e.g. the computer 102) via a web interface. The web interface is provided by a web server (e.g. the web server 108) and allows for access to the shared database 112 as shown by the call flow arrow 120.

Once the user has signed in to access her/his profile on the computer, she/he can manually identify content and topics to build her/his profile at step 404. This can be supported by allowing the user to specify topics from a list of topics and then specifying per topic content from a list of content. For example, the topics might include business, sports, news, entertainment, and weather, to name a few. The user could include weather, news, and business in her/his main menu and then further customize the specific content to be presented within those topics. For example, within weather, the user might select the specific cities she/he wants listed in her/his weather menu and/or the cities for which the weather is automatically played.

Alternatively, at step 402, the user can identify a web location with personalized content to use in building her/his profile, e.g. a uniform resource indicator (URI). For example, FIG. 1 includes the personalized site 130. The personalized site 130 could be a customized portal web page, e.g. myYahoo!, My Netscape, etc., a home page the user herself/himself has designed, and/or any other web page that includes content of interest to the user. The user can identify the personalized site with a uniform resource indicator (URI), including a login identifier and password if necessary, e.g. for myYahoo! The personalized site 130 can then be accessed and the pertinent user preferences, e.g. news, stocks, selected. Taking the example of a customized portal site, the main topics selected, e.g. horoscopes, and the content within, Sagittarius, could be adopted. However, the voice portal 110 may present its own content for that particular item, e.g. the version of the Sagittarius horoscope on the voice portal 110 not the version from the personalized site 130.

The processes of step 402 and step 404 can be used together allowing a user to quickly transfer preferences from a web portal to her/his voice portal while still supporting explicit personalization.

Alternatively, in some embodiments of the invention, an existing web portal profile is voice enabled for use by a voice portal through the association of telephone identifying information with the existing web portal. In this embodiment, at step 402, the telephone identifying information, e.g. the primary calling number, is associated with an existing web profile, e.g. myYahoo! profile, stored in the shared database 112 and that existing web profile is then usable from the voice portal 110 either using voice or touch-tone commands.

At step 406, the profile for use by the telephone interface is updated.

Additionally, web sites like the personalized site 130 may be accessed using the voice portal 110 in some embodiments of the invention through the use of the data connectivity engine 220 as shown in FIG. 2.

F. Profile Building Via Other Web Sites

Some embodiments of the invention may allow users of the voice portal 110 to add to their profile from other web sites. For example, if a user of the computer 102 is accessing a web site (e.g. the personalized site 130), the web site might include a link like "Add this to your voice portal." Thus, for example, from a service such as MapQuest™ or Ameritrade™, the user could click on a link to add a particular piece of content or a particular topic to their portal for the voice portal 110.

For example, a user could add her/his "QQQ" stock symbol to her/his profile on the voice portal 110 even though the voice portal 110 may be operated independently of the particular web site.

This type of web based profile building allows for widespread profile building for the voice portal 110 from a variety of Internet sites. Also, in some embodiments, the web browser software on the user's computer (e.g. the computer 102) can support an option to add a bookmark to the user's profile stored in the shared database 112 for the voice portal 110. For example, a menu option in the browser on the computer 102 might include "Add Page to Voice Portal Shortcuts" and upon selecting that menu option, the current web page would be added to the user's profile on the voice portal 110.

This would typically be accomplished by accessing a URI on the web server 108 that included the information to be added. At that point, the web server 108 might ask for a primary calling phone number and/or a password. In some embodiments, a cookie stored by the browser on the computer 102 may be used to obviate one or both of these steps. After the user provides the information, or it is accepted automatically, a confirmation page may be shown including a return link to the originating web page. Several example URI's for adding content are shown below:

```
<http://www.voiceportal.com/add.cgi?topic=stock%20quote&content=QQQ>
<http://www.voiceportal.com/add.cgi?shortcut=MapQuest&ref=www.mapquest.com/voice.vxml>
<http://www.voiceportal.com/add.cgi?shortcut=myYahoo&ref=my.yahoo.com/voice.vxml&login=jdoe>
```

These examples are illustrative of the various types of URI's that can be placed as links on web sites to allow users of the voice portal 110 to further customize their profile.

G. Locale Based Personalization

Turning to FIG. 5, the basic personalization framework used by several embodiments of the invention is presented. At step 500, a request is made for content, or a topic. Then one or more of steps 502-510 take place, in parallel or sequence, and then the content is presented at step 512. Which of steps 502-510 occur for a given request may be determined based on the topic or content requested. For example, step 504 can be omitted when non-time dependent information is presented.

Turning to step 502, the customization of content based on the calling locale. The telephone identifying information includes information about the caller's locale independent of any user provided registration information. This information can be derived from telephone routing tables that provide a descriptive name for each area code/exchange combination within the North American Numbering Plan (NANP). Thus, the phone number 650-493-#### would be associated with "Palo Alto, Calif.".

Similarly, 650-592-#### would be associated with "San Carlos, Calif.".

This information may be directly present in the telephone identifying information provided to the voice portal 110, or may be ascertained from a local exchange routing guide (LERG). For international callers outside the NANP, similar types of telephone identifying information can be mapped to locales within countries to the extent permitted by the particular numbering plan.

The city-state combination may correspond to multiple locales for the purposes of the voice portal 110. For example, a county-wide or multi-city locale can be defined that encompasses multiple area code/exchange combinations. Thus, a single caller may be in multiple locales.

Locale information can be further refined through the use of additional databases, e.g. city/state to zip code databases, street address to five digit zip code databases, reverse lookup databases that map phone numbers to street addresses, longitude-latitude conversion databases, and/or other databases that provide locale related information from telephone identifying information. Thus, for example, V and H coordinates might be determined using the telephone identifying information. Those can be further converted to a longitude and latitude to determine the locale. Alternatively, a reverse phone number database could be used to find a specific street address for the telephone identifying information.

Examples of the uses for the locale information include: providing locale-appropriate lottery results, providing driving directions to a requested destination, providing locale-appropriate weather reports, providing locale-appropriate show times for movies other events, e.g. cultural, governmental, etc., traffic reports, yellow page listings, and/or providing other locale-related information.

H. Time/Date Based Personalization

Turning to step 504, the customization of content based on the time and/or date will now be described. The telephone identifying information includes information about the caller's locale independent of any user provided registration information. This information can be derived from telephone routing tables that provide a descriptive name for each area code/exchange combination within the NANP. Thus, the phone number 650-493-#### would be associated with "Palo Alto, Calif." and thus the correct time zone, Pacific, could be selected as well.

This time zone may be directly present in the telephone identifying information provided to the voice portal 110, or may be ascertained from the LERG. For international callers outside the NANP, similar types of telephone identifying information can be mapped to locales within countries to the extent permitted by the particular numbering plan. Thus, callers from United Kingdom numbers would be mapped to British Standard Time.

The time zone information allows the voice portal 110 to customize the presentation of information based on the time in the caller's locale. Callers can use a single nationwide, or international, number to reach the voice portal 110, e.g. 800-###-####. The voice portal 110 will use the time zone information to adjust the content presented to each user.

Thus, during the lunch hour, the voice portal 110 might report a stock quote to the user while on a Friday evening, the voice portal 110 might suggest a movie. For example, "It is Friday night, would you be interested in seeing a movie?" A "yes" response by the caller will lead to the presentation of a list that is both time and date adapted and locale appropriate. For example, a caller from Palo Alto at six o'clock p.m. on a Friday would hear about show times after six o'clock p.m. in his local area.

If necessary, the voice portal 110 may connect the user to an appropriate transaction system to complete a user requested transaction such a the purchase of an airline ticket, a movie ticket, an audio CD, etc. However, in many instances, the voice portal 110 may be able to directly complete the transaction using the data connectivity engine 220 and access to the Internet 106 and/or one more databases (e.g. the database 226). This process can occur even if the caller has not explicitly provided the voice portal 110 her/his home location or the current time. For example, this personalized content might be presented immediately at after step 304 of FIG. 3 in step 306.

Similarly, other time sensitive information can be presented such as airline schedules, cultural and other events, etc. Thus, for example a caller asking for flight times to New York from a 650-493-#### telephone number might be prompted to select one of the three local airports: San Francisco International, San Jose International, and Oakland International, and then the flight times to New York after the current time in the Pacific time zone would be presented.

Some additional examples include customizing the presentation of business reports based on whether or not the market is open; modifying the greeting prompt based on the time of day; and providing traffic information automatically during commute hours, but not at other times.

I. Targeted Advertising

Embodiments of the invention support the presentation of targeted advertising, or other content, to callers of the voice portal 110 as shown at step 506. The two primary types of targeted advertising supported by embodiments of the invention will be described. The different types of targeted advertising can be combined as well.

1. Based Solely on Telephone Identifying Information

Telephone identifying information can be used to reference demographic information about callers from a particular area. For example, if the telephone identifying information includes the calling number 650-493-####, corresponding to Palo Alto, Calif., general demographic information about callers from that particular region can be used to target the advertising, or other content. Further, if a reverse lookup database is used, the phone number can, in some instances, locate specific demographic information for a given household, or caller.

This personalization allows the targeting of advertising to qualified callers by the voice portal 112. For example, an advertiser of expensive luxury vehicles might request that its callers be qualified based on their income, or a particular psychographic attribute, e.g. fun-loving. In that case, the demographic profile corresponding to the telephone identifying information can be used to qualify the caller. Thus, callers from the relatively affluent city of Palo Alto, Calif. might receive the advertising. Similarly, if a particular household meets the requirements based on a reverse lookup, those households can receive the advertising as well.

2. Based on Profile

Another source of information about the caller is the profile used by the shared database 112. This profile may indicate interests based on the explicit and implicit preferences, e.g. likes sports, and can be used in combination with the telephone identifying information to more closely tailor ads to the caller.

For example, if the caller has added movie and entertainment information to her/his profile, either explicitly or implicitly, advertising related to movies and entertainment could be favored over other qualified advertising based on the caller's profile. Other examples include providing brokerage, and other financial services, advertisements to callers who frequently check stock quotes and/or have a customized stock list.

J. Adaptive Voice Character

Turning to step 508, the customization of content through adaptive voice character will now be described. The telephone identifying information includes information about the caller's locale independent of any user provided registration information. The locales may be associated with one or more standard voice character settings, e.g. for dialect, and also idiomatic speech. Thus, callers from California may receive different prompts and a different dialect from the voice portal then callers from Florida.

Similarly, the telephone identifying information may include information about the type of phone, e.g. pay phone, hospital phone, etc., that can be used to adjust the voice character, e.g. louder and slower speech.

Additionally, the caller's speaking voice may be used to refine the voice character of the system. Thus, callers with speech patterns from a particular region of the country may find that after several verbal interactions with the voice portal, the content being presented at step 512 is being spoken using a voice character more suited to their own speech patterns. Similarly, in response to callers who request that information be repeated several times, the voice character for those callers may be slowed and played back louder. Additional examples include allowing users to select different voice actors, different background music and/or sound effects, control the verbosity of prompts, etc.

K. Purchase Recommendations

Turning to step 510, the customization of content through purchase suggestions. Based on the caller's profile—as retrieved through the telephone identifying information—and/or demographic information from other sources, e.g. locale based and/or reverse lookup, the system can make purchasing suggestions.

The suggestions could be based on the caller's locale and what others in that locale have purchased. In other embodiments, the suggestions may be based on the profile of the user relative to other user's purchases. In some embodiments, approaches such as collaborative filtering are used to generate recommendations.

Examples of recommendations may include particular goods and services, e.g. flowers for Mom a few days before Mother's Day. Further, the exact suggestion may vary based on the caller's past habits, e.g. in the past you bought chocolates so this year chocolates might be suggested again. Alternatively, if many people from your locale are buying a particular book that might be suggested as well. The particular purchase recommendation may relate to goods and services offered independently, by, and/or in affiliation with the operator of the voice portal 110.

L. Voice Login

As discussed above, the system may support the use of one or more passwords, either spoken or touch-tone for login and authentication purposes. The passwords provide for protection against modifications to a user's profile without authentication. Additionally, certain specific actions, e.g. making a purchase, listening to certain types of personalized content, etc., may require authentication.

Typically, the authentication system will support either a voice or a touch-tone password for users of the voice portal 110. This flexibility addresses situations where the voice password is not working due to line conditions and/or conditions of the calling telephone. Products such as Nuance Verifier™ and/or other voice login and verification products may be used to provide the voice login feature. In some embodiments, both types of authentication may be required.

Once logged in, or authenticated, embodiments of the invention may minimize the need for the user to re-authenticate herself/himself, as described above. Additionally, the password, either voice and/or touch-tone, used for authentication for telephone sessions may be the same or different as any passwords used for authentication for web access to the profile customization options described in conjunction with FIG. 4.

M. Automatic Profile Initialization

As discussed in conjunction with FIG. 3, it may be desirable to initialize the profile using the telephone identifying information. The telephone identifying information can be used to select an appropriate demographic profile and list of topics based on the calling locale. In other embodiments, a reverse lookup of the calling number provided with the telephone identifying information is used to obtain a specific demographic profile for a caller and/or her/his household.

Then the demographic information derived from the locale and/or the reverse lookup are used to set initial profile values. For example, the user's income might be estimated based on the average income for the calling locale, e.g. Palo Alto, Calif., or from demographic information from the reverse lookup. Similarly, the caller's initial topics might be selected based on commonly selected topics for her/his locale and/or the preferences available based on the demographic information retrieved by the reverse lookup.

These initial values may be revised based on a caller's later actions. For example, if the initial estimate of a caller's age is too high, later actions may cause that information to be revised. Similarly, callers may be permitted to explicitly provide certain types of demographic information as needed. For example, the user might provide her/his birth date to a horoscope feature provided by the voice portal 110, in that instance, the birth date might be incorporated into the profile.

N. Electronic Commerce Features

The preceding discussion has focused on personalization of content for users accessing the voice portal 110. This section describes special commerce features within various embodiments of the invention. A transcript from a possible interaction between a user ("C") and the voice portal 110 ("S") will be provided. The transcript will be discussed segment by segment. In some instances, phrases will be included between angle brackets, e.g. "< >", in those cases an appropriate substitution with the indicated value(s) should be made. After the dialogue from the transcript is discussed the process will be described in greater detail with respect to FIG. 6.

| Transit Segment 1 |
| --- |
| 1. Sample Dialogue Transcript |
| 1 S    <Introduction> |
| 2 S    <Optional Sponsorship> |
| 3 S    You can interrupt the system at any time. |
| 4 S    If you need assistance, say "help". |
| 5 S    Main Menu. Options: stocks, news, personal or travel. |
| 6 C    Travel. |
| 7 S    Welcome to the flight reservations system. |
| 8 S    What city would you like to depart from? San Francisco, Oakland, or San Jose? |
| 9 C    San Francisco. |
| 10 S   San Francisco. What city are you flying to? |
| 11 C   Las Vegas. |
| 12 S   Las Vegas. On what date would you like to depart? |
| 13 C   June first. |
| 14 S   June first. Around what time would you like to depart? |
| 15 C   7 p m |
| 16 S   Seven p m. How many travelers? |
| 17 C   one |
| 18 S   One traveler. Will this be round trip or one way? |
| 19 C   Round trip |
| 20 S   Round trip. On what day would you like to return? |
| 21 C   June seventh |
| 22 S   June seventh. Around what time would you like to return? |
| 23 C   Nine a m |
| 24 S   Nine a m. One moment while I locate flights. |

Turning to the first segment of the transcript. The voice portal 110 introduces itself to the user at lines 1-5. Notice that sponsorship information can be inserted into the conversation, e.g. line 2. For example, the voice portal might offer a personalized advertisement, see above, at line 2. The sponsorship might also be personalized topically based on the subject matter of the purchase, e.g. travel.

In this example, the user is attempting to purchase an airline ticket. The user lives in Palo Alto, Calif., and so the personalization features of the system described above allow the system at line 8 to prompt the user with the most likely departure airports. Thus, the personalization features are easily combinable with the commerce features of embodiments of the invention. In appropriate circumstances, the list provided might be adjusted based on the user's present location as opposed to the user's home. For example, if the user were to call from a pay phone in Washington, D.C., the airports in the D.C. area might be listed in addition to, or instead of, the San Francisco area airports.

At lines 9-24 of the transcript, the user provides information to clarify her/his purchase requests. Airline tickets require a more elaborate dialogue than say music CDs because there is more information to specify.

In contrast, if at line 6 the user said, "Music", and that was a valid option, the system might ask for the artist or album name. Then, the user might be prompted to select from a short list of found items. For example, the user might say "98 Degrees" and the system might offer "There are three albums from 98 Degrees, please select 98 Degrees, 98 Degrees and Rising, or 98 Degrees Christmas." Upon selecting one or more of those albums, the conversation could then continue.

| Transcript Segment 2 |
| --- |
| Continuing with the transcript for the airline ticket purchase: |
| 25 S    <Airline> is offering a special fare of $248 for flights to Las Vegas in June. To hear more about this offer, say"<Airline>".To hear a list of other flights, say "more flights". |
| 26 C   <Airline> |
| 27 S    <Airline> flight 2315, departs San Francisco on June 1st, at 7:14 p.m. and arrives in Las Vegas at 9:50 p.m. The return flight is <Airline> flight 7006, departing Las Vegas on June $7^{th}$, at 8:40 a.m., and arriving in San Francisco at 10:10p.m. |
| 28 S    To reserve this <Airline> flight, say "reserve it". To hear a list of other flights, say "more flights". |
| 29 C   Reserve it. |
| 30 S    Your <Airline> flight has been reserved. Your <Airline> confirmation number is <Confirmation Number>. |
| 31 S    Remember, that you can view details of this transaction, as well as others, at voiceportal.com. |
| 32 S    To purchase this ticket, please say "purchase", say "hold" to hold the reservation for twenty-four hours. |
| 33 C   Purchase |

Lines 25 through 33 of the transcript show the recommendation and reservation process. At line 25, the system is generating a recommendation. This recommendation may be based on a match between the user's requested schedule and the best fare for that schedule. Additionally, other preferences could be taken into account.

For example, between lines 24 and 25 of the dialogue, the system could access the user profile to determine that the user prefers to fly Southwest Airlines. That preference may be derived from either an implicit, or explicit, personalization, see above. As a result, the recommendation generated at line 25 may be based on that preference and as a result Southwest Airlines flights might be suggested first.

Also, between lines 29 and 30 of the dialogue the voice portal 110 can access the user profile corresponding to the telephone identifying information to assist in completing the transaction. More specifically, the user's full name, address, shipping information, credit card number, and/or other personal information can be retrieved from the user's profile. Also, embodiments of the invention can support other types of payments than credit cards, most generally any form of payment identifier can be used, e.g. automated check clearinghouse (ACH) information, electronic currency, credit card numbers, smart card payment certificate, and/or other suitable forms of payment and identification of that payment can be used.

This information can then be provided to the merchant to complete the transaction. If the information is not available in the user's profile, it can be obtained from the user. Users need not be re-prompted for information already in their profile, even for new merchants. Thus, if the user's full name and address are in the profile, no questions would have to be asked at this point of the example dialogue because only a name and address are needed to reserve an airline ticket.

In contrast, if that information was not known, the voice portal 110 could interactively obtain the necessary information prior to continuing at line 30 of the dialogue and reserving the ticket. If necessary, or appropriate, a human operator may be brought on the line to receive the information and update the user's profile. Typically, voice and/or touch tone responses may be used in conjunction with information about the user's calling locale as derived from telephone identifying information to update the information without the assistance of a human operator.

Once the user's profile contains adequate information to complete the required function, e.g. reserve an airline ticket, the voice portal 110 can complete the task. This might be done by accessing a database (e.g. the database 228) belonging to the airline over the Internet 106, or some other network or communication channel. For example, the reservation database for Southwest Airlines might be accessed directly using electronic data interchange (EDI) format, extensible markup language (XML), and/or some other protocol. Those same protocols may have been used to obtain the flight information from the database at line 25 of the dialogue.

In other instances, the execution engine 202 and the data connectivity engine 220 may access a web site 230, or a web server, and perform the necessary transactions. Specifically, the voice portal could respond to the purchase command by executing a request to a server using the HTTP protocol or the secure hypertext transfer protocol (HTTPS). The secure socket layers (SSL) protocol can be used to ensure the privacy and security of the transaction. For example, if Southwest Airlines has a web site (e.g. the web site 230) that supports electronic commerce using SSL, HTTPS and/or HTTP, the data connectivity engine 220 could supply the requisite information to the web site 230 to place a reservation and/or purchase tickets.

In these situations, the data connectivity engine 220 and the voice portal 110 acts in a similar fashion to a user's web browser. The voice portal 110 accesses the web site 230 for the user and provides information in appropriate fields from the user's profile. This interaction with a web site may occur while the user waits or in the background, with confirmation provided to the user at a later point.

In some instances, one or more web site descriptions may be developed to allow access by the data connectivity engine 220 to web sites for commerce purposes. The web site description may describe how to search for products and services. For example, a uniform resource indicator (URI) for the search engine and the format for search queries for a particular web site (e.g. the web site 230) might be included. The web site description may also specify how to parse search results. The web site descriptions may specify how to initiate a purchase transaction and as well as a mapping between user profile information and fields on the web site's forms. The web site description may specify how to parse confirmation and transaction results. The web site descriptions allow the data connectivity engine 220 to act as an automated agent for the user. Further, they also allow for the generation of a cross-merchant record of all purchases made with the voice portal 110, e.g. a voice receipt. Notification of the creation of a voice receipt is shown in line 31 of the sample transcript. These voice receipts may be accessible over the web as suggested by line 31 of the dialogue. Voice receipts may also be reviewed directly within the voice portal 110 in some embodiments of the invention.

The voice receipt may contain information about a purchase, e.g. product/service, description, time of purchase, merchant/vendor/provider name, price paid, credit card used, order number, confirmation number, status—e.g. on backorder, shipped, 24 hours to purchase, awaiting trade execution, etc. —and/or other information relating to the transaction.

Notably, the status information may be obtained through dynamic access to one or more merchant data sources. For example, if the voice receipt was for a trading request, the status information might be obtained from the brokerage company's computer systems by the data connectivity engine 220. The voice receipts offer a powerful management tool to users for tracking purchases made using the voice portal at multiple merchants. As in the case of this airline example, the voice receipt may include helpful information, e.g. the confirmation number, in a secure easily accessible location, obviating the need to manually record it with pen and paper at the time of the transaction.

In this example with airline tickets, a distinction is made between reserving the tickets and purchasing them. This distinction is specific to this type of product because airlines allow customers to reserve tickets for twenty-four hours before purchasing them. At lines 31-33 of the dialogue, the user requests the purchase of the airline ticket.

Transcript Segment 3

| | | |
|---|---|---|
| 34 | S | In order to complete this transaction using one your credit cards on file, we need to confirm your identity. Please speak or touch-tone your password. If you prefer to use a different credit card, please speak or touch-tone that credit card number now. |
| 35 | C | <Password> |
| 36 | S | We have confirmed your identity. Which credit card would you like to use? <Card1> <Card2>, or <Card3> |
| 37 | C | <Card2> |
| 38 | S | Thank you, now processing your transaction. |
| 39 | S | <Musical Interlude> |
| 40 | S | Your ticket has now been purchased using your <Card2> credit card. You can review details of this transaction as well as others at voiceportal.com or by requesting "Receipts" from the main menu. |

In this example, this is the first transaction for this telephone session, as such the voice portal 110 requests password confirmation from the user before allowing the purchase to be completed. In some embodiments of the invention, the user is prompted for a password for all purchases. In other embodiments, a password is only requested for the first purchase in each telephone session. In other embodiments, the password is requested a single time in each session for all purposes. In some embodiments of the invention, users of wireless telephones may, as a default setting, not be required to provide a password since it is assumed that the wireless telephone is not shared by multiple users.

The ability to quickly reference credit card information already on file improves transaction speed by eliminating the need for the user to re-provide information. This same approach can be used to select shipping addresses. For example, the system might prompt, "Do you want this order sent to your billing address, home address or work address?" to allow the user to select a shipping address for delivery of products.

The commerce model employed by the voice portal 110 is designed to allow purchases using a single command, "Purchase", or similar phrases. In other words, the neither a password, a credit card selection, need be required from the user. Thus, the user input must specify a product selection and the user must issue the "Purchase" command.

Accordingly, the voice portal need not maintain a shopping cart, or similar construct for a user, store, or session. Further, the commerce model of the voice portal 110 is independent of the commerce model used by any merchant. Thus, the voice portal 110 may enable its users to buy items from web sites that use a shopping cart model using the one word purchase commerce model of the voice portal 110. Thus, the purchase of multiple CDs at a music store by a user of the voice portal 110 can each be treated as separate purchases. Further, for each CD, all order information may be provided to the merchant by the voice portal 110 as outlined above.

The order fulfillment process used by a given merchant may group related purchases from a user over a predetermined time period, e.g. session, day, week, month, etc. For example, the voice portal 110 might combine all CD purchases made in a single session into a single order in the merchant's computer systems. Alternatively, the merchant may combine the separate orders for fulfillment purposes.

Similarly, if desirable, the voice portal 110 may group distinct purchases from a single merchant within a predetermined time period, e.g. session, day, week, month, etc., into a single voice receipt with, if appropriate, status information for the individual items and/or the group of items as a whole.

Additionally, the voice portal 110 may support a number of additional electronic commerce features. For example, accessory services may be provided relative to a purchase, e.g. status change notifications for a product. For example, the voice portal 110 might prompt, "For twenty-five cents, we can notify you if your flight is delayed or changed, say 'notify me', to request this service." Similarly, the voice portal 110 might prompt, "For ten cents, we can send you an alpha-numeric page when your trade is executed, say 'page me', to request this service."

In some instances, there may be no charge for the accessory service. The accessory service may be available irrespective of whether a particular merchant/vendor supports a feature. For example, a brokerage firm might provide e-mail trade confirmations. However, the voice portal 110 may use its interface to the brokerage systems to independently provide other features, e.g. pager notification.

Similarly, the voice portal 110 may recommend related products, e.g. cross-sell. So in the example above of purchasing hotel tickets to Las Vegas, the system dialogue might prompt the user: "Our records indicate that <Convention> is being held in Las Vegas during your stay and hotel availability is low, would you like to book a hotel room now?" If the user says yes, the dialogue can unfold much as it did for the purchase of the airline ticket.

2. Process Detail

Figure 6:
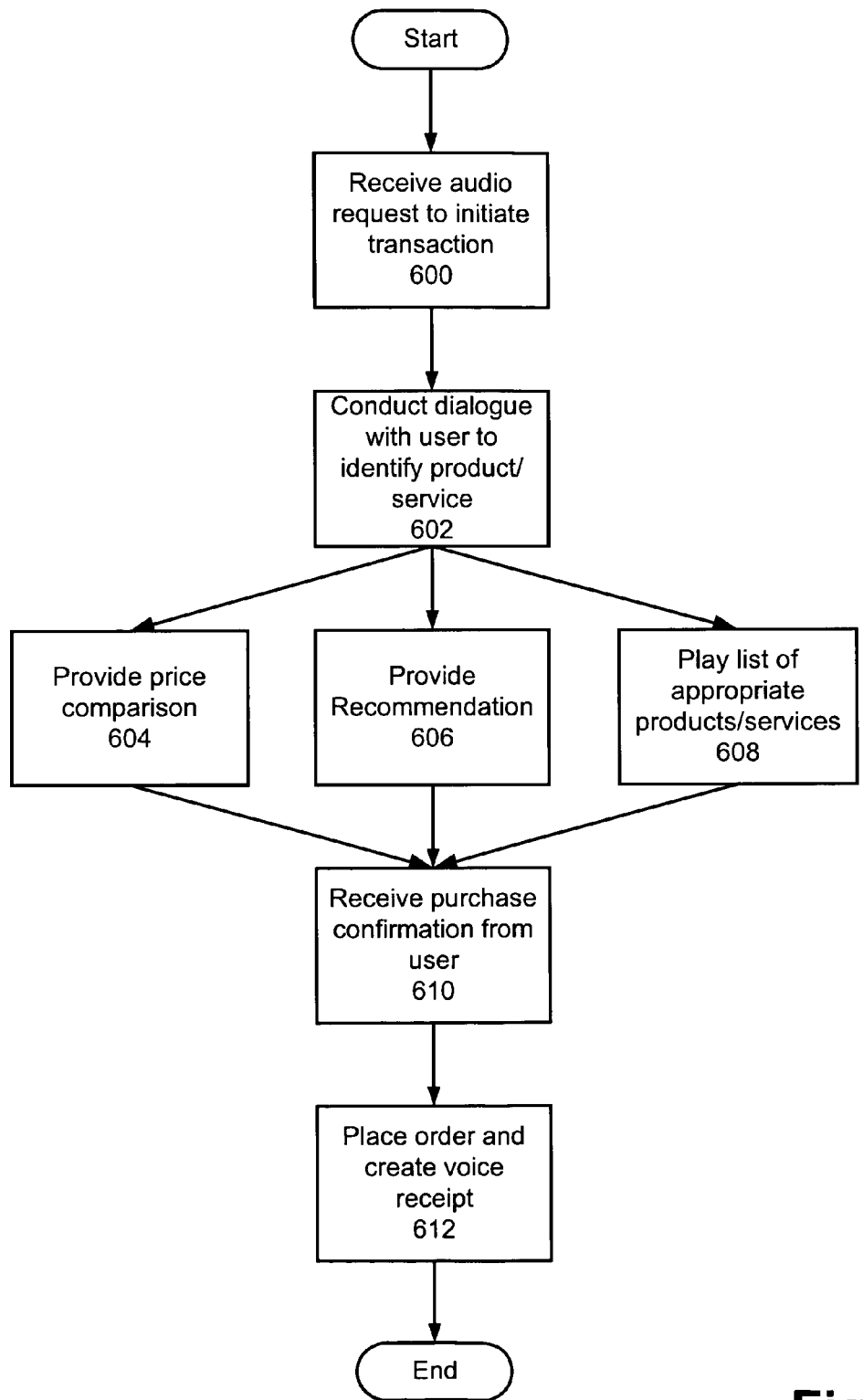
FIG. 6 is a process flow diagram for conducting electronic commerce over a telephone interface according to some embodiments of the invention.

FIG. 6 is a process flow diagram for conducting electronic commerce over a telephone interface according to some embodiments of the invention. The process of FIG. 6 could be used by the voice portal 110 to provide electronic commerce over a telephone interface. Throughout the discussion of FIG. 6, it will be assumed that the user has been identified by the voice portal 110, as in FIG. 1, e.g. using the telephone identifying information 114. Alternatively, some embodiments of the invention may use alternative means to identify the caller to the voice portal, e.g. an explicit login process.

First, at step 600, an audio request is received to initiate a transaction. This request may take the form of the user requesting a specific topic within the voice portal 110, e.g. travel, stock trading, music store, etc., or a more specific request, e.g. the user might say "I want to buy the new CD from 98 Degrees." Other audio input formats, including touch-tone are possible.

Next, at step 602, the voice portal 110 conducts an audio dialogue with the user to more specifically identify the product or service they wish to purchase. For the purposes of this discussion, a product will be considered either a product or a service. For example, if the user has entered the travel category, a dialogue like the example above for airline tickets might unfold. In contrast, in music, or some other type of, store, the user might be prompted to provide search terms, or other product identifiers. Once, the voice portal 110 has identified a product with sufficient specificity, any of steps 604-608 may occur. Steps 604-608 may occur in parallel, in sequence, based on user requests, and/or asynchronously in the background.

For example, the user might automatically be presented a recommendation at step 606, e.g. a specific product like the CD "98 Degrees and Rising" or the specially priced airline ticket. Meanwhile, price comparisons for that product at different merchants could occur in the background at step 604. Also, a list of The dialogue process of step 602 and the processes of steps 604-608 may occur iteratively until the user has identified a product she/he wishes to purchase. Thus in the airline ticket purchase example above, if the user was not satisfied with the recommendation, the user could request a list of flights at step 608. If she/he was still not satisfied, she/he could return to step 602 and adjust her/his request.

At step 610, a purchase confirmation is received from the user for the identified product. The confirmation from the user typically takes the form of a single word or command phrase such as "Purchase" or "Buy It", or a similar phrase. Because the user's identifying information is already available based on the associated profile for the telephone identifying information, it is not necessary to input names, addresses, and credit card numbers typically. If telephone identifying information is unavailable, then the user may be required to login and identify herself/himself. However, the provision of address information and credit card information, etc., would still be automated.

Periodically, for security purposes a password, or other identifier, may be requested from the user in conjunction with step 610. For example, the first purchase of each telephone session might require a password identifier.

At step 612, the order is then placed with the merchant. The order may be placed through a number of electronic means. Notably, the order may be placed directly through a general purpose electronic commerce web site (e.g. the web site 230) using SSL and/or HTTPS with the voice portal 110 acting as a browser on behalf of the user. The voice portal 110 can fill out forms on the web site using information from the user profile. In other embodiments, XML, EDI, and/or other proprietary or non-proprietary formats are used to place the order with the merchant. These same techniques can be used at steps 604-608 to access information about products and services available for sale. Thus, it is not necessary for merchants to specially design their electronic commerce sites to support the voice portal 110 or the purchase model used by the voice portal 110. However, for efficiency reasons a particular web site may provide a custom mechanism for the voice portal 110 to conduct commerce via HTTP, HTTPS and/or SSL as well as a custom data exchange format for obtaining information and placing orders.

Additionally, a voice receipt can be generated for the transaction at step 612. The voice receipt includes information about the transaction as described above. When appropriate, status information can be included as part of the voice receipt. The status information can be dynamically obtained from the appropriate merchant for inclusion in the voice receipt when it is reviewed. For example, an order for CDs might have shipping status information extracted directly from the merchant at the time the voice receipt is reviewed. The voice receipts may be reviewed on a web site for the voice portal 110 and/or on the voice portal 110 itself, e.g. over the telephone The process of FIG. 6 omits data collection steps that may, in some instances, be necessary to complete certain types of orders. For example, basic information such as name, address, shipping address, and credit card number are needed for many transactions. That information can be collected as needed for various purposes throughout the entire voice portal 110. Thus, an earlier request for driving directions may have provided the user's address to the voice portal 110. As part of step 610, additional data can be collected either using audio input and output to a computer or to a human operator. The user of the voice portal 110 may not even be aware that a human operator is receiving her/his input for entry into her/his profile. In addition, reverse lookup information can be used to derive the user's name and address or assist in verification of the user's input. The voice portal 110 minimizes the need for re-entry of data by maximizing usage of user profile information across different merchants/vendors.

Still other embodiments of the invention allow a user to signal on a web site to have the vendor contact them to complete the transaction by telephone. This may allow for better support of customers who are uncomfortable making purchases over the Internet and/or make it easier for customers to make purchases from new vendors. For example, if Jane Doe already has a profile established with the voice portal 110, then she can circumvent the purchase process at a particular merchant by clicking on a link to have the voice portal 110 call her. In some instances, the user may be asked to provide her/his phone number on the web site.

Still other information that is needed may be product/service specific, e.g. type of seating, pant size, etc. That information may be obtained as part of the dialogue at step 602 and/or stored as user preferences by the voice portal 110.

In some embodiments of the invention, a list of items may be presented to a user, e.g. a top n list of books, music, etc. The voice portal 110 may pause briefly between items in the list to receive a purchase request, e.g. "Buy It" or a touchtone signal. Thus, the purchase model is extended to handle purchases from a list of items. This may also be helpful when the user has requested a search and wants to purchase one of the items provided in the result list.

O. Conclusion

Thus, the voice portal 110 can serve as a telephone to HTTP, HTTPS, and/or SSL gateway for commerce purposes. Further, the voice portal 110 supports a one word purchase commerce model that greatly reduces the overhead of completing transactions with multiple vendors using the telephone interface. Further, the model abstracts the particular purchase/transaction/vending model used by the vendor in favor of a uniform interface provided by the voice portal 110. Typical embodiments of the invention may support one or more words, phrases, or DTMF signals for use as the purchase command in the one word purchase model.

A number of different personalization features provided by embodiments of the invention have been described, those features can be combined in a number of ways to provide personalized commerce services.

In some embodiments, voice portal 110 can be hardware based, software based, or a combination of the two. In some embodiments, voice portal 110 is comprised of one or more computer programs that are included in one or more computer usable media such as CD-ROMs, floppy disks, or other media. In some embodiments, call manager programs, execution engine programs, data connectivity engine programs, evaluation engine programs, streaming subsystem programs, recognition server programs, and/or text to speech programs are included in one or more computer usable media.

Some embodiments of the invention are included in an electromagnetic wave form. The electromagnetic waveform comprises information such as call manager programs, execution engine programs, data connectivity engine programs, evaluation engine programs, streaming subsystem programs, recognition server programs, and/or text to speech programs. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of facilitating an electronic commerce transaction between a user and a merchant, the method comprising:

operating a computer system that is unaffiliated with a second set of computer systems utilized by a set of merchants to provide electronic commerce, the computer system being configured to respond to a user's audio command representing an audio purchase request received via a telephone interface system of the computer system;

presenting one or more offerings provided by at least one of the set of merchants in audio format via the telephone interface system;

identifying a particular merchant of the at least one of the set of merchants to whom the audio purchase request is relevant in response to receiving the audio purchase request;

automatically establishing an electronic communication link between the computer system and a particular computer system of the second set of computer systems that is affiliated with the particular merchant; and performing by said computer system acting as an agent for the user, the electronic commerce transaction initiated by the audio purchase request.

2. The method of claim 1, wherein the telephone interface system receives telephone identifying information, the method further comprising:
accessing a user profile corresponding to the telephone identifying information, the user profile corresponding to Information about a user; and
including, information from the user profile in at least one of a first request or a second request to the particular computer system.

3. The method of claim 2, wherein the user profile includes at least one of a name, an address, a credit card number, a credit card expiration date, an electronic mail address, or a telephone number.

4. The method of claim 2, wherein the user profile includes information obtained from a reverse directory lookup on the telephone identifying information.

5. The method of claim 2, further comprising:
providing a third audio request over the telephone interface system, the third audio request corresponding to a request for at least one of a name, an address, a credit card number, a credit card expiration date; an electronic mail address, or a telephone number;
receiving: an audio information response over the telephone interface system, the audio information response corresponding to at least one of a name, an address, a credit card number, a credit card expiration date, an electronic mail address, or a telephone number; and
including the corresponding at least one of a name, an address, a credit card number, a credit card expiration date, an electronic mail address, or a telephone number in the user profile.

6. The method of claim 2, wherein the second set of computer systems includes a web server providing an HTML order form, and wherein the second request comprises HTML form data corresponding to information from the user profile.

7. The method of claim 2, wherein the second set of computer systems includes a web server supporting an HTTP protocol, and wherein the second request comprises data corresponding to information from the user profile sent using the HTTP protocol.

8. The method of claim 2, wherein an Internet access system supports access to the second set of computer systems using one or more of a secure sockets layer (SSL) protocol, a hypertext transfer protocol (HTTP), or a secure hypertext transfer protocol (HTTPS).

9. The method of claim 8, wherein the second request includes at least one of hypertext markup language (HTML) data or extensible markup language (XML) data sent to the second computer system using HTTPS.

10. The method of claim 8, wherein the second set of computer systems includes a web server providing an HTML order form, and wherein the second request comprises HTML form data corresponding to an order for a product.

11. The method of claim 2, further comprising responsive to a first response from the particular computer system, generating a voice receipt, the voice receipt corresponding to information about the electronic commerce transaction.

12. The method of claim 11, wherein the voice receipt includes at least one of a name of a product, a description of the product, a name of the merchant, a contact information for the merchant, a price paid for the product, an order number, a confirmation number, or a status.

13. The method of claim 11, wherein the voice receipt includes a status, the status corresponding to information retrieved from the particular computer system about the electronic commerce transaction.

14. The method of claim 11, further comprising:
receiving an audio request, the audio request corresponding to a request to review the voice receipt; and
responsive to the audio request, providing a second audio response over the telephone interface, the second audio response corresponding to information from the voice receipt.

15. The method of claim 2, wherein the receiving the audio purchase request comprises receiving a verbal request for a product, and performing voice recognition on the verbal request to determine the product.

16. The method of claim 2, wherein the receiving the audio purchase request comprises receiving a series of one or more touch tone signals and decoding the series of one or more touch tone signals to determine the product.

17. The method of claim 2, wherein the receiving the audio purchase request comprises receiving a verbal request for a merchant, and performing voice recognition on the verbal request to determine the merchant.

18. The method of claim 2, wherein the receiving the audio purchase request comprises receiving a series of one or more touch tone signals and decoding the series of one or more touch tone signals to determine the merchant.

19. A method of facilitating an electronic commerce transaction between a user and a merchant, the method comprising:
operating a computer system that is unaffiliated with a second set of computer systems utilized by a set of merchants to provide electronic commerce, the computer system being configured to respond to a user's audio command representing an audio purchase request received via a telephone interface system of the computer system;
presenting one or more offerings provided by at least one of the set of merchants in audio format via the telephone interface system;
converting at the computer system the received audio command to an electronic command in response to receiving the audio purchase request;
identifying a particular merchant of the set of merchants to whom the audio purchase request is relevant;
automatically establishing by the computer system an electronic communication link with a particular computer system of the second set of computer systems that is affiliated with the particular merchant by utilizing the electronic command; and
performing by said computer system acting as an agent for the user, the electronic commerce transaction initiated by the audio purchase request.

20. The method of claim 19, further comprising:
providing a single command commerce model using the computer system, wherein the computer system includes the telephone interface system coupled in communications with an Internet access system, the telephone interface system being coupled in communications with a telephone;
receiving the audio purchase request over the telephone interface system, the audio purchase request corresponding to a product for sale from the particular merchant, which uses a particular electronic commerce model, wherein the single command commerce model abstracts the particular electronic commerce model used by the particular merchant such that the computer system provides a uniform interface, which is independent of the particular electronic commerce model used by the particular merchant, between the telephone and the particular merchant;

responsive to the audio purchase request, performing the following sending a first request to the particular computer system over the Internet access system, the first request corresponding to a request for information about the product, receiving a first response from the particular computer system over the Internet access system, the first response corresponding to an information about the product, providing an audio response over the telephone interface system, the audio response corresponding to the information, receiving a confirmatory audio request over the telephone interface system; and responsive to the confirmatory audio request, performing the following sending a second request to the particular computer system over the Internet access system, the second request corresponding to a request to purchase the product from the particular merchant;

receiving a second response from the particular computer system over the Internet access system, the second response corresponding to a confirmation of the second request; and providing a second audio response over the telephone interface system, the second audio response indicating completion of the electronic commerce transaction, wherein the telephone interface system receives telephone identifying information, the method further comprising: accessing a user profile corresponding to the telephone identifying information, the user profile corresponding to information about a user; and including information from the user profile in at least one of the first request or the second request.

21. The method of claim 20, wherein the user profile includes at least one of a name, an address, a credit card number, a credit card expiration date, an electronic mail address, or a telephone number.

22. The method of claim 20, wherein the user profile includes information obtained from a reverse directory lookup on the telephone identifying information.

23. The method of claim 20, further comprising:
providing a third audio request over the telephone interface system, the third audio request corresponding to a request for at least one of a name, an address, a credit card number, a credit card expiration date, an electronic mail address, or a telephone number;

receiving an audio information response over the telephone interface system, the audio information response corresponding to at least one of a name, an address, a credit card number, a credit card expiration date, an electronic mail address, or a telephone number; and including the corresponding at least one of a name, an address, a credit card number, a credit card expiration date, an electronic mail address, or a telephone number in the user profile.

24. The method of claim 20, wherein the second set of computer systems include a web server providing an HTML order form, and wherein the second request comprises HTML form data corresponding to information from the user profile.

25. The method of claim 20, wherein the second set of computer systems include a web server supporting an HTTP protocol, and wherein the second request comprises data corresponding to information from the user profile sent using the HTTP protocol.

26. The method of claim 20, wherein the Internet access system supports access to the second set of computer systems using one or more of a secure sockets layer (SSL) protocol, a hypertext transfer protocol (HTTP), or a secure hypertext transfer protocol (HTTPS).

27. The method of claim 26, wherein the second request includes at least one of hypertext markup language (HTML) data or extensible markup language (XML) data sent to the second computer system using HTTPS.

28. The method of claim 26, wherein the second set of computer systems include a web server providing an HTML order form, and wherein the second request comprises HTML form data corresponding to an order for the product.

29. A computer system for facilitating an electronic commerce transaction between a user and a merchant comprising:

a network interface including at least one program to access a second set of computer systems using one or more of a SSL protocol, a HTTP, or a HTTPS, the second set of computer systems being utilized by a set of merchants to provide electronic commerce;

a telephone interface to receive a user's audio purchase request and to receive telephone identifying information corresponding to the telephone, wherein the user is presented one or more offerings provided by at least one of the set of merchants in audio format via the telephone interface; and a computer system to control the network interface and the telephone interface, the computer system being unaffiliated with the second set of computer systems and facilitating an electronic commerce transaction with a particular computer system of the second set of computer systems, automatically establishing an electronic communication link with the particular computer system to initiate an electronic commerce transaction, wherein, the particular computer system is associated with a particular merchant of the set of merchants to be identified from the received audio purchase request, and wherein said computer system acting as an agent for the user, performs the electronic commerce transaction initiated by the audio purchase request.

30. The computer system of claim 29, wherein the control subsystem includes at least one program for providing a single command commerce model, processing an audio request to purchase a product from the particular merchant, which uses a particular electronic commerce model, wherein the single command commerce model abstracts the particular electronic commerce model used by the particular merchant such that a uniform interface, which is independent of the particular electronic commerce model used by the particular merchant, is provided between the telephone and the particular merchant, and completing the electronic commerce transaction for the product with the particular merchant over the network interface responsive to an audio confirmation, and wherein the at least one program in the control subsystem further accesses a user profile corresponding to the telephone identifying information, the user profile corresponding to information about a user and wherein the completing further comprises providing at least a portion of the user profile to the particular merchant over the Internet interface.

31. The computer system of claim 30, wherein the at least one program in the control subsystem further for generating a voice receipt responsive to the completing, the voice receipt corresponding to information about the electronic commerce transaction.

32. A computer system for facilitating an electronic commerce transaction between a user and a merchant comprising:
    means for the computer system to operate independently and separately from a second set of unaffiliated computer systems utilized by a set of merchants to provide electronic commerce;
    means for responding to a user's audio command representing an audio purchase request;
    means for presenting one or more offerings provided by at least one of the set of merchants in audio format via a telephone interface system;
    means for identifying a particular merchant of the set of merchants to whom the audio purchase request is relevant;
    means for automatically establishing an electronic communication link with a particular computer system of the second set of computer systems; and
    means for electronically interacting by the computer system acting as an agent for the user with the particular computer system of the second set of computer systems to perform an electronic commerce transaction initiated by the audio purchase request.

33. The computer system of claim 32, further comprising:
    means for receiving telephone identifying information associated with a telephone;
    means for providing a single command commerce model;
    means for receiving the audio request to initiate the electronic commerce transaction over the telephone;
    means for selecting a product from the particular merchant using an audio dialogue, wherein the particular merchant uses a particular electronic commerce model, wherein the single command commerce model abstracts the particular electronic commerce model used by the particular merchant such that a uniform interface, which is independent of the particular electronic commerce model used by the particular merchant, is provided between the telephone and the particular merchant;
    means for receiving audio confirmation of the electronic commerce transaction of the product; and
    means for completing the electronic commerce transaction over the Internet with the second computer system, and
    wherein the means for completing further comprises:
        means for accessing a user profile corresponding to the telephone identifying information, the user profile corresponding to information about a user;
        means for providing at least a portion of the user profile to the second computer system over the Internet to complete the electronic commerce transaction.

34. The computer system of claim 33, further comprising means for providing a voice receipt of the electronic commerce transaction, the voice receipt corresponding to a record of the electronic commerce transaction.

35. The computer system of claim 33, wherein the means for selecting comprises:
    means for comparing prices for the product at a plurality of merchants of the set of merchants;
    means for providing a list of a predetermined number of merchants from the plurality of merchants of the set of merchants over the telephone, the predetermined number of merchants offering the product at a lower price than other merchants in the plurality of merchants; and
    means for receiving an audio selection of one of the merchants in the list, the selection corresponding to the particular merchant.

36. A method for facilitating an electronic commerce transaction between a user and a merchant comprising:
    operating a first computer system that is unaffiliated with a second set of computer systems utilized by a set of merchants to provide electronic commerce to a user, the first computer system being configured to respond to an audio command representing a one or more of an audio purchase inquiry and an audio purchase confirmation received via a telephone interface system of the computer system to purchase the item;
    receiving an audio purchase inquiry from the user associated with an electronic commerce transaction;
    receiving telephone identifying information via the telephone interface system;
    accessing a user profile corresponding to the telephone identifying information, the user profile corresponding to information about the user;
    identifying a set of criteria governing the electronic commerce transaction based on a set of audio correspondences with the user, the set of criteria indicates a preference for one or more of a type of offering and a merchant; presenting one or more offerings of a type that is associated with the preference provided by at least one of the set of merchants to the user in audio format via the telephone interface system;
    receiving the audio purchase confirmation from the user for an offering of the one or more offerings, identifying a particular merchant of the set of merchants from whom the offering is provided;
    providing a third audio request over the telephone interface system, the third audio request corresponding to a request for at least one of a name, an address, a credit card number, a credit card expiration date, an electronic mail address, or a telephone number;
    receiving an audio information response over the telephone interface system, the audio information response corresponding to at least one of a name, an address, a credit card number, a credit card expiration date, an electronic mail address, or a telephone number;
    storing the corresponding at least one of a name, an address, a credit card number, a credit card expiration date, an electronic mail address, or a telephone number in the user profile;
    automatically establishing an electronic communication link with the particular computer system of the second set of computer systems that is affiliated with the particular merchant;
    communicating with the particular computer system to complete the electronic commerce transaction initiated by the audio purchase inquiry; wherein the communicating with the particular computer system comprises providing information from the user profile to the particular computer system; and
    generating a voice receipt, the voice receipt corresponding to information about the electronic commerce transaction, wherein the voice receipt includes at least one of a name of a product, a description of the product, a name of the particular merchant, a contact information for the particular merchant, a price paid for the product, an order number, a confirmation number, or a status.

37. The method of claim 36, further comprising:
providing a single command commerce model using the first computer system coupled to the telephone by a telephone interface and supporting access to an Internet;
receiving a signal from the second computer system over the Internet, the second computer system operated by the Particular merchant selling the item and using a particular electronic commerce model, wherein the single command commerce model abstracts the particular electronic commerce model used by the particular merchant such that the first computer system provides a uniform interface, which is independent of the particular electronic commerce model used by the particular merchant, between the telephone and the particular merchant, the signal corresponding to a request to place a telephone call to a user at a telephone number to complete the purchase of the item;
calling the user over the telephone at the telephone number using the telephone interface using the first computer system;
conducting an audio dialogue over the telephone interface with the user using the first computer system to obtain at least one of a name, an address, a credit card number, a credit card expiration date, an electronic mail address, a telephone number, a confirmation of the purchase, or a password; and
completing the purchase of the item by sending a message to the second computer over the Internet, the message including at least a portion of personal identifying information obtained in the audio dialogue, and
wherein the conducting the audio dialogue comprises:
identifying a user profile associated with the telephone number;
making an audio request, the audio request corresponding to a request for a password from the user;
receiving an audio response, the audio response corresponding to a password from the user; and wherein the completing occurs responsive to verification of the password provided by the user against the password in the user profile.

38. A method of completing a user's purchase over a telephone from a list including a plurality of items, the method comprising:
operating a first computer system that is unaffiliated with a second set of computer systems utilized by a set of merchants to provide electronic commerce, the first computer system being configured to respond to the user's audio command representing a request to purchase from the list, and the telephone being coupled to the first computer system by a telephone interface;
using the first computer system to present each of the plurality of items in the list over the telephone interface;
identifying a particular merchant of the set of merchants to whom the audio command is relevant in response to the audio command, and causing the computer system to automatically establish an electronic communication link with a particular computer system of the second set of computer systems that is affiliated with the particular merchant; and
communicating by the computer system acting as an agent for the user with the particular computer system to perform an electronic commerce transaction to complete the purchase from the list.

39. The method of claim 38, wherein a pause of a predetermined amount of time is inserted between the presentation of each item in the list.

40. A method for facilitating an electronic commerce transaction between a user and a merchant using information transmitted over a telephone interface coupled to a computer, the method comprising:
operating the computer that is unaffiliated with a second set of computer systems utilized by a set of merchants to provide electronic commerce, the computer being configured to respond to the user's audio command;
presenting by the computer one or more offerings provided by at least one of the set of merchants in audio format via the telephone interface;
identifying a particular merchant of the at least one of the set of merchants to whom the audio command is relevant in response to receiving the audio command over the telephone interface, and causing the computer to automatically establish an electronic communication link with and communicate with a particular computer system of the second set of computer systems that is affiliated with the particular merchant;
performing by said computer acting as an agent for the user, the electronic commerce transaction initiated by the audio command; and
wherein transmitting information over the telephone interface comprises:
sending audio data from the computer to an audio interface for presenting the audio data to a human, the audio data pertaining to an electronic commerce transaction between the computer and the particular computer system;
receiving data on the computer, the data corresponding to a speech recognition result for the audio data by said human; and
responsive to receiving the data, updating a data storage device coupled to the computer by storing the speech recognition result in said data storage device.

41. The method of claim 40, wherein the speech recognition result indicates that the human could not process the audio data, the method further comprising repeating the method until the speech recognition result no longer indicates that the human could not process the audio data.

* * * * *

UNITED STATES PATENT AND TRADEMARK OFFICE
CERTIFICATE OF CORRECTION

| | | |
|---|---|---|
| PATENT NO. | : 7,376,586 B1 | Page 1 of 1 |
| APPLICATION NO. | : 09/466236 | |
| DATED | : May 20, 2008 | |
| INVENTOR(S) | : Hadi Partovi et al. | |

It is certified that error appears in the above-identified patent and that said Letters Patent is hereby corrected as shown below:

In Title page 4, in Item (56), under "Other Publications" column 2, line 38, below "V-commerce.com." insert -- V-COMMERCE-WHITE PAPER", 10/6/98, Nuance Communications --.

In column 27, line 9, in Claim 2, delete "Information" and insert -- information --, therefor.

In column 27, line 10, in Claim 2, delete "including," and insert -- including --, therefor, In column 27, line 24, in Claim 5, delete "date;" and insert -- date, --, therefor, In column 27, line 26, in Claim 5, delete "receiving:" and insert -- receiving --, therefor.

In column 27, line 36, in Claim 6, delete "includes" and insert -- include --, therefor, In column 27, line 41, in Claim 7, delete "includes" and insert -- include --, therefor, In column 27, line 55, in Claim 10, delete "includes" and insert -- include --, therefor.

In column 33, line 10, in Claim 37, delete "Particular" and insert -- particular --, therefor.

Signed and Sealed this
Third Day of May, 2011

David J. Kappos
*Director of the United States Patent and Trademark Office*